US012393443B2

(12) United States Patent
Fishel et al.

(10) Patent No.: US 12,393,443 B2
(45) Date of Patent: Aug. 19, 2025

(54) SYSTEMS AND METHODS FOR TASK SWITCHING IN NEURAL NETWORK PROCESSOR

(71) Applicant: Apple Inc., Cupertino, CA (US)

(72) Inventors: Liran Fishel, Raanana (IL); Erik K. Norden, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/361,616

(22) Filed: Jul. 28, 2023

(65) Prior Publication Data

US 2024/0069957 A1 Feb. 29, 2024

Related U.S. Application Data

(63) Continuation of application No. 15/971,276, filed on May 4, 2018, now Pat. No. 11,740,932.

(51) Int. Cl.
*G06F 3/00* (2006.01)
*G06F 9/48* (2006.01)
*G06F 9/54* (2006.01)
*G06F 13/16* (2006.01)
*G06F 13/28* (2006.01)
(Continued)

(52) U.S. Cl.
CPC ............ *G06F 9/4843* (2013.01); *G06F 9/544* (2013.01); *G06F 13/1673* (2013.01); *G06F 13/28* (2013.01); *G06N 3/045* (2023.01); *G06N 3/063* (2013.01)

(58) Field of Classification Search
CPC ........................................................ G06F 9/54
See application file for complete search history.

(56) References Cited

U.S. PATENT DOCUMENTS 7,509,671 B1 * 3/2009 Bedell .................... G06Q 10/06
718/103
7,945,909 B2 5/2011 Mariotti et al.
(Continued)

FOREIGN PATENT DOCUMENTS

CN 106209682 A 12/2016

OTHER PUBLICATIONS

Lixia .Zhang, Virtual Clock: A New Traffic Control Algorithm for IPacket-Switched Networks. (Year: 1991).*
(Continued)

*Primary Examiner* — Lechi Truong
(74) *Attorney, Agent, or Firm* — Sterne, Kessler, Goldstein & Fox P.L.L.C.

(57) ABSTRACT

Embodiments relate to managing tasks that when executed by a neural processor circuit instantiates a neural network. A neural task manager circuit within the neural processor circuit can switch between tasks in different task queues. Each task queue is configured to store a reference to a task list of tasks for instantiating a neural network. Each task queue can also be assigned a priority parameter. While the neural processor circuit is executing tasks of a first task list and prior to completion of each task, the neural task manager circuit can switch between task queues according to the priority parameters for execution of tasks of a second task list by the neural processor circuit. The neural processor circuit includes one or more neural engine circuits that are configured to perform neural operations by executing the tasks assigned by the task manager.

19 Claims, 16 Drawing Sheets

(51) Int. Cl.
*G06N 3/045* (2023.01)
*G06N 3/063* (2023.01)

(56) References Cited

U.S. PATENT DOCUMENTS

| | | | |
|---|---|---|---|
| 8,407,528 B2 | 3/2013 | Larson | |
| 9,436,504 B2 | 9/2016 | Durant | |
| 2003/0172190 A1 | 9/2003 | Greenblat | |
| 2006/0161696 A1* | 7/2006 | Anjo | G06F 15/7867 710/22 |
| 2007/0022194 A1* | 1/2007 | Brown | H04L 67/02 709/224 |
| 2009/0225733 A1 | 9/2009 | Kovacik | |
| 2009/0320034 A1* | 12/2009 | Tsunoda | G11C 7/1006 711/E12.001 |
| 2011/0252428 A1* | 10/2011 | Maruyama | G06F 9/4843 718/103 |
| 2011/0288847 A1 | 11/2011 | Narayanan et al. | |
| 2012/0143863 A1 | 6/2012 | Tran | |
| 2014/0307721 A1 | 10/2014 | Smith | |
| 2016/0028635 A1 | 1/2016 | Wang | |
| 2016/0314030 A1* | 10/2016 | Wilson | G06F 9/546 |
| 2016/0364644 A1 | 12/2016 | Brothers et al. | |
| 2016/0379109 A1* | 12/2016 | Chung | G06N 3/063 706/26 |
| 2017/0097625 A1* | 4/2017 | Waskito | G05B 19/0426 |
| 2017/0249081 A1* | 8/2017 | Tzori | G06F 3/0608 |
| 2017/0272304 A1 | 9/2017 | Castleman | |
| 2018/0188975 A1* | 7/2018 | Benisty | G06F 3/0679 |
| 2018/0191642 A1* | 7/2018 | Biederman | H04L 49/9005 |
| 2019/0057302 A1* | 2/2019 | Cho | G06N 3/063 |
| 2019/0102672 A1* | 4/2019 | Bifulco | G06N 3/04 |
| 2019/0114534 A1 | 4/2019 | Teng | |
| 2019/0347545 A1 | 11/2019 | Zhang | |
| 2019/0354496 A1* | 11/2019 | Nielsen | G06N 3/084 |
| 2019/0370631 A1 | 12/2019 | Fais et al. | |
| 2019/0392194 A1 | 12/2019 | Croxford et al. | |
| 2020/0019436 A1* | 1/2020 | Toku | G06F 9/4887 |
| 2020/0082274 A1 | 3/2020 | Rossi | |
| 2020/0218509 A1 | 7/2020 | Xu | |
| 2021/0182077 A1* | 6/2021 | Chen | G06N 3/045 |
| 2021/0224051 A1* | 7/2021 | Bequet | G06F 9/45533 |

OTHER PUBLICATIONS

Ranjita Bhagwan, Fast and Scalable Priority Queue Architecture for High-Speed Network Switches. (Year: 2000).*
Anastasiya Mishchuk, Working hard to know your neighbor's margins: Local descriptor learning loss. (Year: 2017).*
Le Nguyen Binh, A Neural-Network Contention Controller for Packet Switching Networks. (Year: 1995).
Mustafa K. Mehmet-Ali, The Performance Analysis and Implementation of an Input Access Scheme in a High-speed Packet Switch. (Year: 1994).
Uttam Kumar, A Survey on Intrusion Detection Systems for Cloud Computing Environmen, (Year: 2015).
Karlheinz Meier, Design and Implementation of a Multi-Class Network Architecture for Hardware Neural Networks. (Year: 2008).

* cited by examiner

SYSTEMS AND METHODS FOR TASK SWITCHING IN NEURAL NETWORK PROCESSOR

This application is a continuation application and claims benefit of U.S. patent application Ser. No. 15/971,276 filed on May 4, 2018, which is incorporated herein by reference in its entirety.

BACKGROUND

1. Field of the Disclosure

The present disclosure relates a circuit for implementing a neural network and more specifically to managing for neural network tasks.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, number of channels in input data, kernel data to be used, non-linear function to be applied to convolution result, and applying of various post processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of a central processing unit (CPU) as well as increase the overall power consumption.

SUMMARY

Embodiments relate to managing tasks that when executed by a neural processor circuit instantiates a neural network. A neural task manager circuit within the neural processor circuit can switch between tasks in different task queues. Each task queue is configured to store a reference to task list of tasks for instantiating a neural network. Each task queue can also be assigned a priority parameter. As such, the neural task manager circuit can switch between task queues according to the priority parameters. The neural processor circuit also includes one or more neural engine circuits that are configured to perform neural operations by executing the tasks assigned by the task manager.

Some embodiments include a method for task switching in a neural processor circuit. A reference to a first task list of first tasks that instantiates a first neural network by a neural engine circuit is stored in a first task queue circuit of a neural task manager circuit of the neural processor circuit. A reference to a second task list of second tasks that instantiates a second neural network by the neural engine circuit is stored in a second task queue circuit of the neural task manager circuit. During execution of one of the first tasks by the neural engine circuit, a task arbiter circuit, of the neural task manager circuit coupled to the first and second task queue circuits, sends configuration data for one of the second tasks, from a memory external to the neural processor circuit, for programming the neural engine circuit to instantiate at least a portion of the second neural network by executing the one of the second tasks.

BRIEF DESCRIPTION OF THE DRAWINGS

Figure (FIG. 1 is a high-level diagram of an electronic device, according to one embodiment FIG. 2 is a block diagram illustrating components in the electronic device, according to one embodiment.

Figure 1:
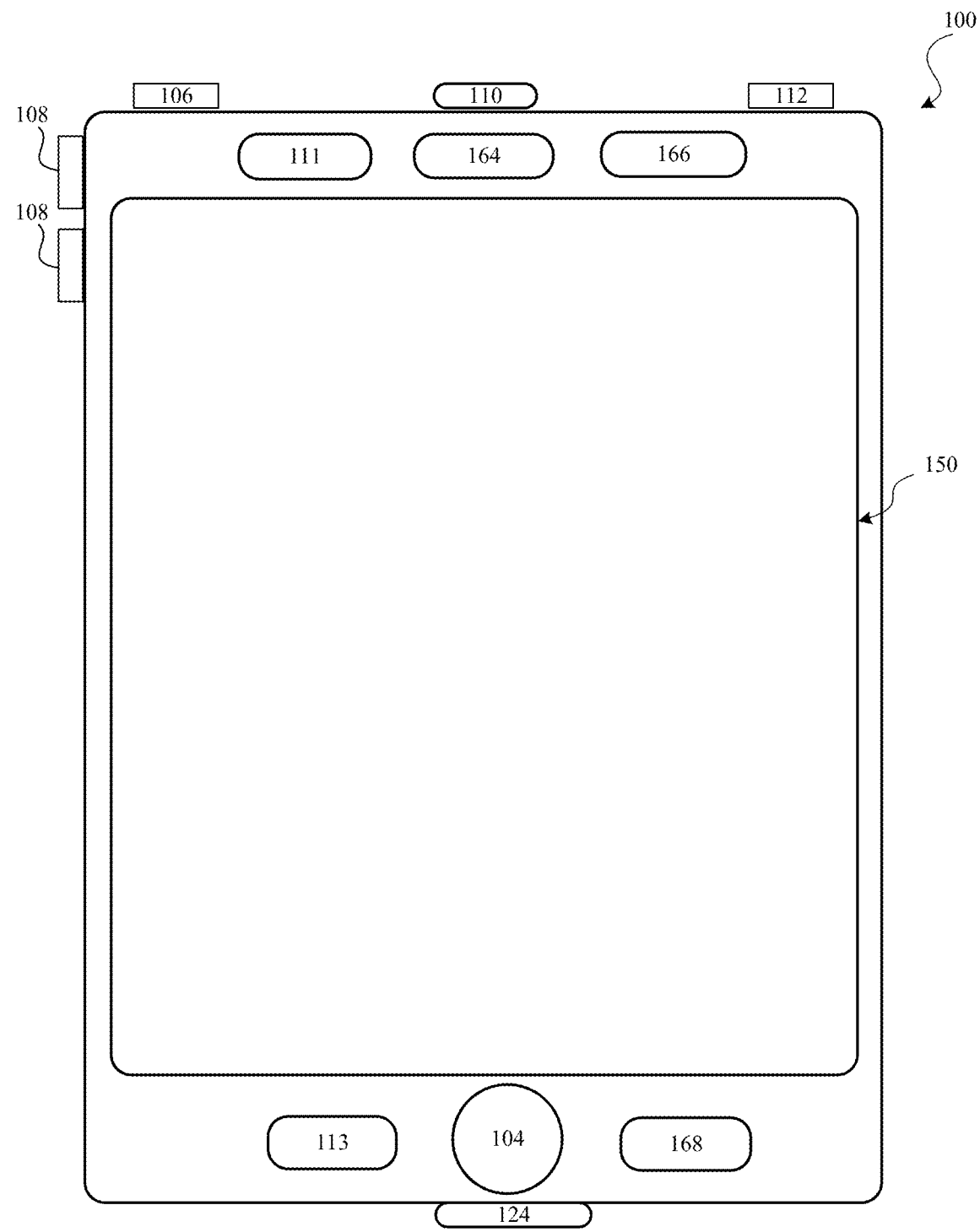

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to managing tasks that when executed by a neural processor circuit instantiates a neural network. A machine learning operation, such as an inferencing operation or a training operation, is defined by a task list of tasks. The neural processor circuit includes one or more neural engines and a neural task manager. The neural task manager includes multiple task queues and a task arbiter. Each task queue stores a task list of tasks for a machine learning operation. Each task list or task queue may be associated with a priority parameter. The task arbiter retrieves configuration data for a task from an external memory based on the priority parameters, and provides the configuration data to components of the neural processor circuit including the one or more neural engines. In some embodiments, the neural task manager includes a configuration queue that stores configuration data of committed tasks selected by the task arbiter, and provides the configuration data to other components of the neural processor circuit. The configuration data programs the neural processor circuit to execute the task. For example, the configuration data may include input data and kernel data processed by a neural engine to execute the task. The configuration data may further include instructions for retrieving and handling the configuration data, and instructions for storing output data of the neural engine. Among other things, the neural task manager allows the neural processor circuit to efficiently handle multiple machine learning operations. Furthermore, the neural task manager may facilitate task switching when a higher priority task is stored in a task queue while a lower priority task is being executed.

Furthermore, the neural task manager, through the task arbiter, can facilitate task switching between task queues, according to the priority parameter. While the neural processor circuit is executing tasks of a first task list referenced by a first task queue and prior to execution of each of the tasks in the first task queue, the neural task manager can cause the neural processor circuit to task switch and execute one or more tasks of a second task list referenced by a second task queue. After the one or more tasks of the second task list has been executed, the neural processor circuit may return to unexecuted tasks of the first task list.

A "task" described herein refers to a processing operation of the neural processor circuit that instantiates a network layer of a neural network, multiple network layers of a neural network, or a portion of a network layer of a neural network. A "task list" described herein refers to a sequence of tasks, such as a sequence of tasks that executed by the neural processor circuit instantiates multiple network layers of a neural network.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
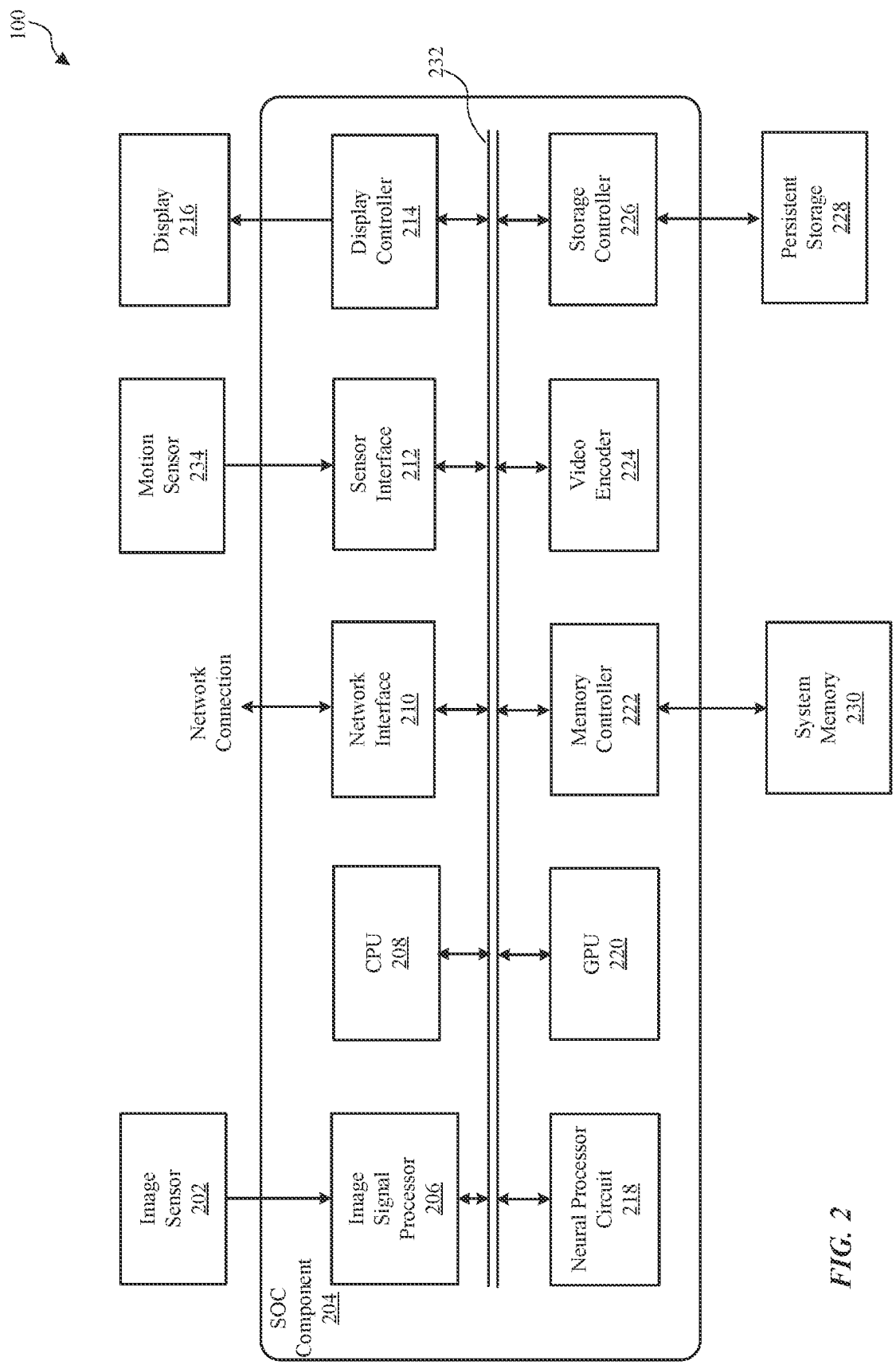

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, motion (orientation) sensor 234, and display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

Image sensor 202 is a component for capturing image data and may be embodied, for example, as a complementary metal-oxide-semiconductor (CMOS) active-pixel sensor, a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 216 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computations including multiplication, addition, and accumulation. Such computations may be arranged to perform, for example, convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, system memory 230 or other sources such as network interface 210 or GPU 220. The output of neural processor circuit 218 may be provided to various components of device 100 such as the image signal processor 206, system memory 230 or CPU 208 for various operations. The structure and operation of neural processor circuit 218 is described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230.

Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

Example Neural Processor Circuit

Neural processor circuit 218 is a configurable circuit that performs neural network operations on the input data based at least on kernel data 340. For this purpose, neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data buffer 318 and buffer DMA 320. Neural processor circuit 218 may include other components not illustrated in FIG. 3.

Each of neural engines 314 performs computing operations for neural network operations in parallel. Depending on the load of operation, entire set of neural engines 314 may be operated or only a subset of the neural engines 314 may be operated while the remaining neural engines 314 are placed in a power save mode to conserve power. Each of neural engines 314 includes components for storing one or more kernels, for performing multiply-accumulate operations, and for post-processing to generate an output data 328, as described below in detail with reference to FIG. 4. One example of a neural network operation is a convolution operation.

Figure 3:
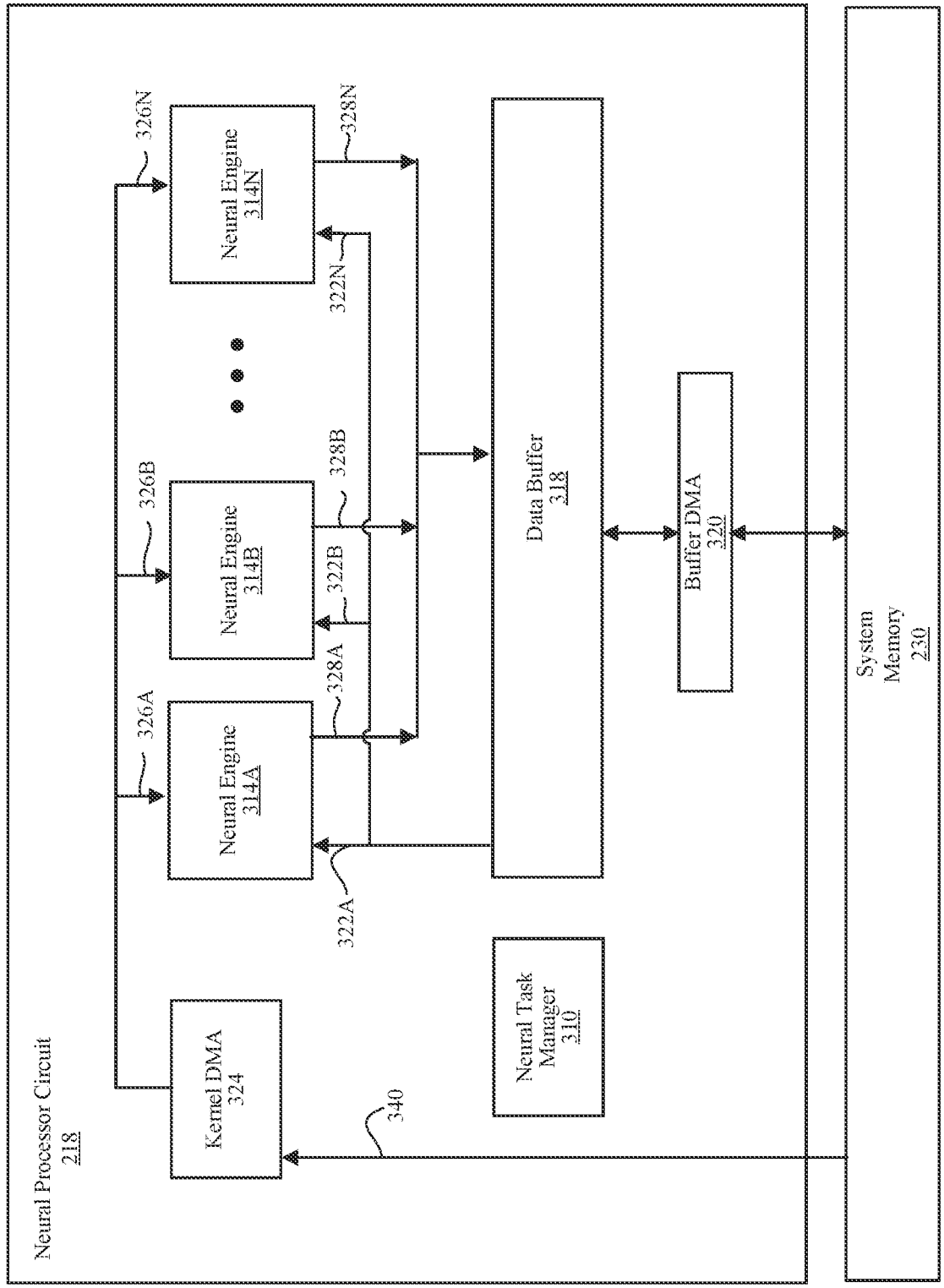
FIG. 3 is a block diagram illustrating a neural processor circuit, according to one embodiment.

Neural task manager 310 manages the overall operation of neural processor circuit 218. Neural task manager 310 may receive a task list from a compiler executed by CPU 208, store tasks in its task queues, choose a task to perform, and send instructions to other components of the neural processor circuit 218 for performing the chosen task. Neural task manager 310 may also perform switching of tasks on detection of events such as receiving instructions from CPU 208. In one or more embodiments, the neural task manager 310 sends rasterizer information to the components of the neural processor circuit 218 to enable each of the components to track, retrieve or process appropriate portions of the input data and kernel data, as described below in detail with reference to FIGS. 5 through 7. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances.

Data buffer 318 is a temporary storage for storing data associated with the neural network operations. In one embodiment, data buffer 318 is embodied as a memory that can be accessed by all of the neural engines 314. Data buffer 318 may store input data 322A through 322N for feeding to corresponding neural engines 314A through 314N, as well as output from each of neural engines 314A through 314N for feeding back into neural engines 314 or sending to a target circuit (e.g., system memory 230). The operations of data buffer 318 and other components of the neural processor circuit 218 are coordinated so that the input data and intermediate data stored in the data buffer 318 is reused across multiple operations at the neural engines 314, and thereby reduce data transfer to and from system memory 230. Data buffer 318 may be operated in a broadcast mode where input data of all input channels are fed to all neural engines 314 or in a unicast mode where input data of a subset of input channels are fed to each neural engine 314.

The input data 322 stored in data buffer 318 can be part of, among others, image data, histogram of oriented gradients (HOG) data, audio data, meta data, output data 328 of a previous cycle of the neural engine 314, and other processed data received from other components of the SOC component 204.

Buffer DMA 320 includes a read circuit that receives a portion (e.g., tile) of the input data from a source (e.g., system memory 230) for storing in data buffer 318, and a write circuit that forwards data from data buffer 318 to a target (e.g., system memory).

Example Neural Engine Architecture

Figure 4:
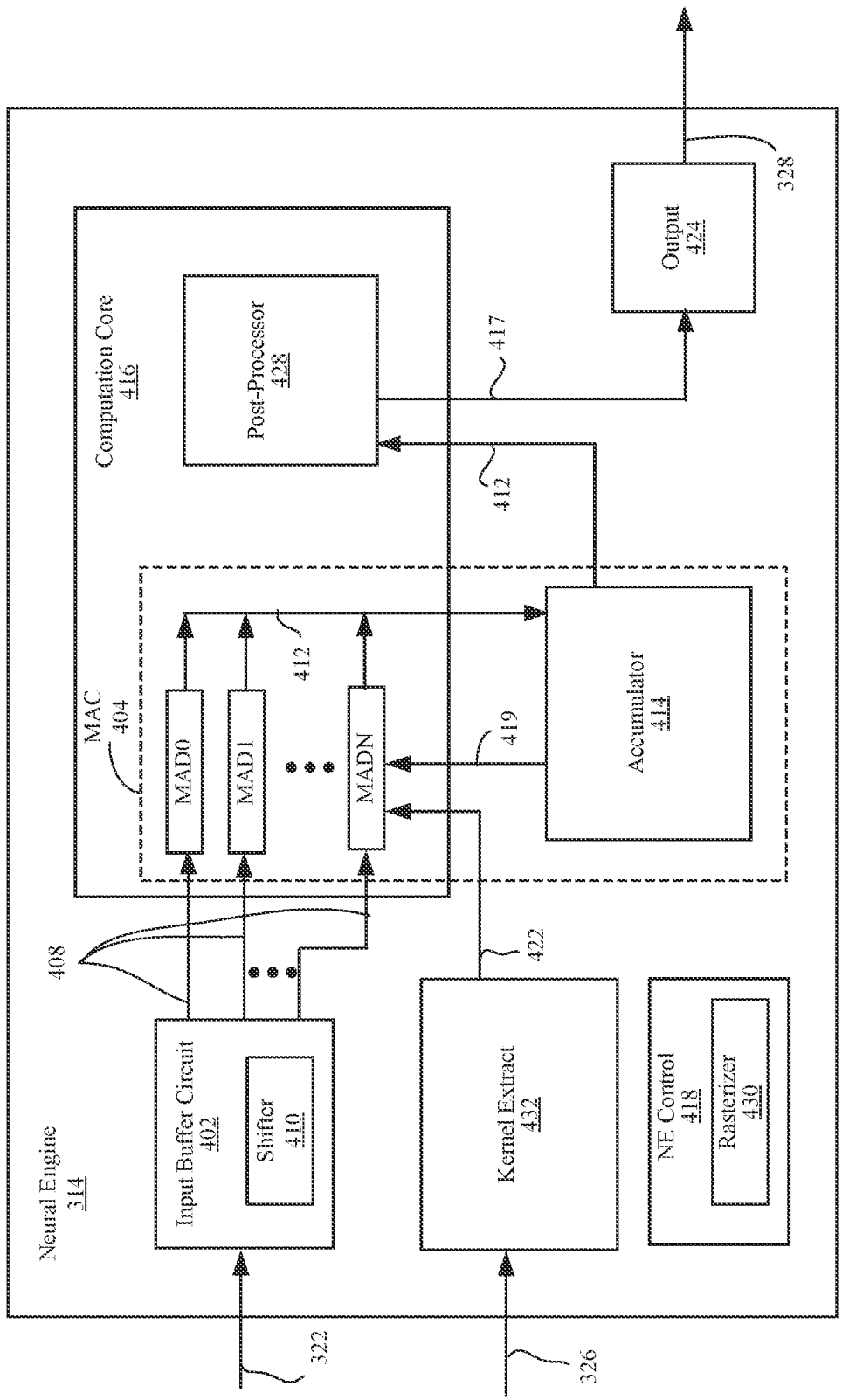
FIG. 4 is a block diagram of a neural engine in the neural processor circuit, according to one embodiment.

FIG. 4 is a block diagram of the neural engine 314, according to one embodiment. The neural engine 314 performs various operations to facilitate neural network operations such as convolution, spatial pooling, and local response normalization. The neural engine 314 receives the input data 322, performs multiply-accumulate operations (e.g., convolution operations) on the input data 322 based on stored kernel data, performs further post-processing operations on the result of the multiply-accumulate operations, and generates the output data 328. The input data 322 and/or the output data 328 of the neural engine 314 may be of a single channel or multiple channels.

Neural engine 314 may include, among other components, input buffer circuit 402, computation core 416, neural engine (NE) control 418, kernel extract circuit 432, accumulators 414 and output circuit 424. Neural engine 314 may include further components not illustrated in FIG. 4.

Input buffer circuit 402 is a circuit that stores a portion of the input data 322 as it is received from the data buffer 318 and sends an appropriate portion 408 of input data for a current task or process loop to computation core 416 for processing. Input buffer circuit 402 includes a shifter 410 that shifts read locations of input buffer circuit 402 to change the portion 408 of input data sent to computation core 416. By changing portions of input data provided to the computation core 416 via shifting, neural engine 314 can perform multiply-accumulate for different portions of input data based on fewer number of read operations. In one or more embodiments, the input data 322 includes data of difference convolution groups and/or input channels.

Kernel extract circuit 432 is a circuit that receives kernel data 326 from kernel DMA 324 and extracts kernel coefficients 422. In one embodiment, the kernel extract circuit 432 references a look up table (LUT) and uses a mask to reconstruct a kernel from compressed kernel data 326. The mask indicates locations in the reconstructed kernel to be padded with zero and remaining locations to be filled with numbers. The kernel coefficients 422 of the reconstructed kernel are sent to computation core 416 to populate register in multiply-add (MAD) circuits of computation core 416. In other embodiments, the kernel extract circuit 432 receives kernel data in an uncompressed format and the kernel coefficients are determined without referencing a LUT or using a mask.

Computation core 416 is a programmable circuit that performs computation operations. For this purpose, the computation core 416 may include MAD circuits MAD0 through MADN and a post-processor 428. Each of MAD circuits MAD0 through MADN may store an input value in the portion 408 of the input data and a corresponding kernel coefficient in the kernel coefficients 422. The input value and the corresponding kernel coefficient are multiplied in each of MAD circuits to generate a processed value 412.

Accumulator 414 is a memory circuit that receives and stores processed values 412 from MAD circuits. The processed values stored in accumulator 414 may be sent back as feedback information 419 for further multiply and add operations at MAD circuits or sent to post-processor 428 for post-processing. Accumulator 414 in combination with MAD circuits form a multiply-accumulator (MAC) 404. In one or more embodiments, accumulator 414 may have subunits where each subunit sends data to different components of neural engine 314. For example, during a processing cycle, data stored in a first subunit of accumulator 414 is sent to MAC circuit while data stored in a second subunit of accumulator 414 is sent to post-processor 428.

Post-processor 428 is a circuit that performs further processing of values 412 received from accumulator 414. The post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from the post-processor 428 as processed values 417 to output circuit 424.

NE control 418 controls operations of other components of the neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator 414 to MAC circuits, and perform different types of post-processing operations at post processor 428. To configure components of the neural engine 314 to operate in a desired manner, the NE control 418 sends a control signal to components of the neural engine. NE control 418 may also include rasterizer 430 that tracks the current task or process loop being processed at neural engine 314, as described below in detail with reference to FIG. 5 through 7.

Output circuit 424 receives processed values 417 from the post-processor 428 and interfaces with data buffer 318 to store processed values 417 in data buffer 318. For this purpose, output circuit 424 may send out as output data 328 in a sequence or a format that is different from the sequence or format in which the processed values 417 are processed in post-processor 428.

The components in the neural engine 314 may be configured during a configuration period by the NE control 418 and the neural task manager 310. For this purpose, the neural task manager 310 sends configuration information to the neural engine 314 during the configuration period. The configurable parameters and modes may include, but are not limited to, mapping between input data elements and kernel elements, the number of input channels, the number of output channels, performing of output strides, and enabling/selection of post-processing operations at the post processor 428.

Operation of Segmenting of Data for Processing at Neural Processor Circuit

Input data is typically split into smaller pieces of data for parallel processing at multiple neural engines 314. Often multiple cycles of operations are performed to generate output for a task associated with a neural network. A compiler executed by CPU 208 analyzes the hierarchy and nodes of the neural network and determines how the input data is to be segmented based on the hardware constraints of the neural processor circuit 218. One of functions of the compiler is to determine how input data is to be split into smaller data units for processing at the neural engines 314, and how the processing is to be iterated in loops to produce the result for tasks.

Figure 5:
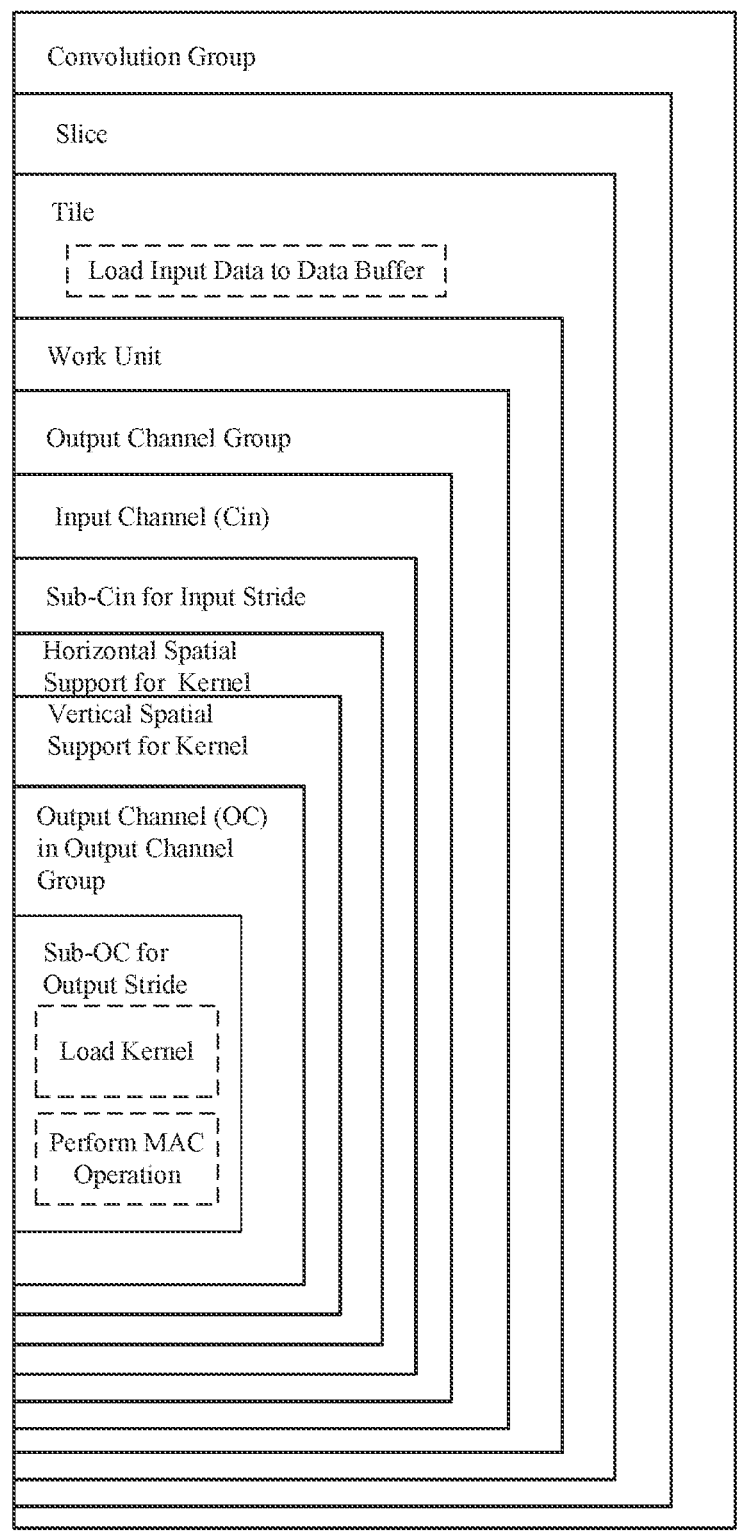
FIG. 5 is a conceptual diagram illustrating loops for processing input data at the neural processor circuit, according to one embodiment.

FIG. 5 is a conceptual diagram illustrating loops for processing the input data at neural processor circuit 218, according to one embodiment. The outermost loop represents processing for a convolution group, if group convolution involving multiple convolution group is used. Group convolutions are convolutions where input data of the input channels in each group are used only for generating output data of output channels of each group but are not used for generating output data for output channels of other groups. Hence, each group of the group convolution can be treated as a separate convolution operation.

Figure 6:
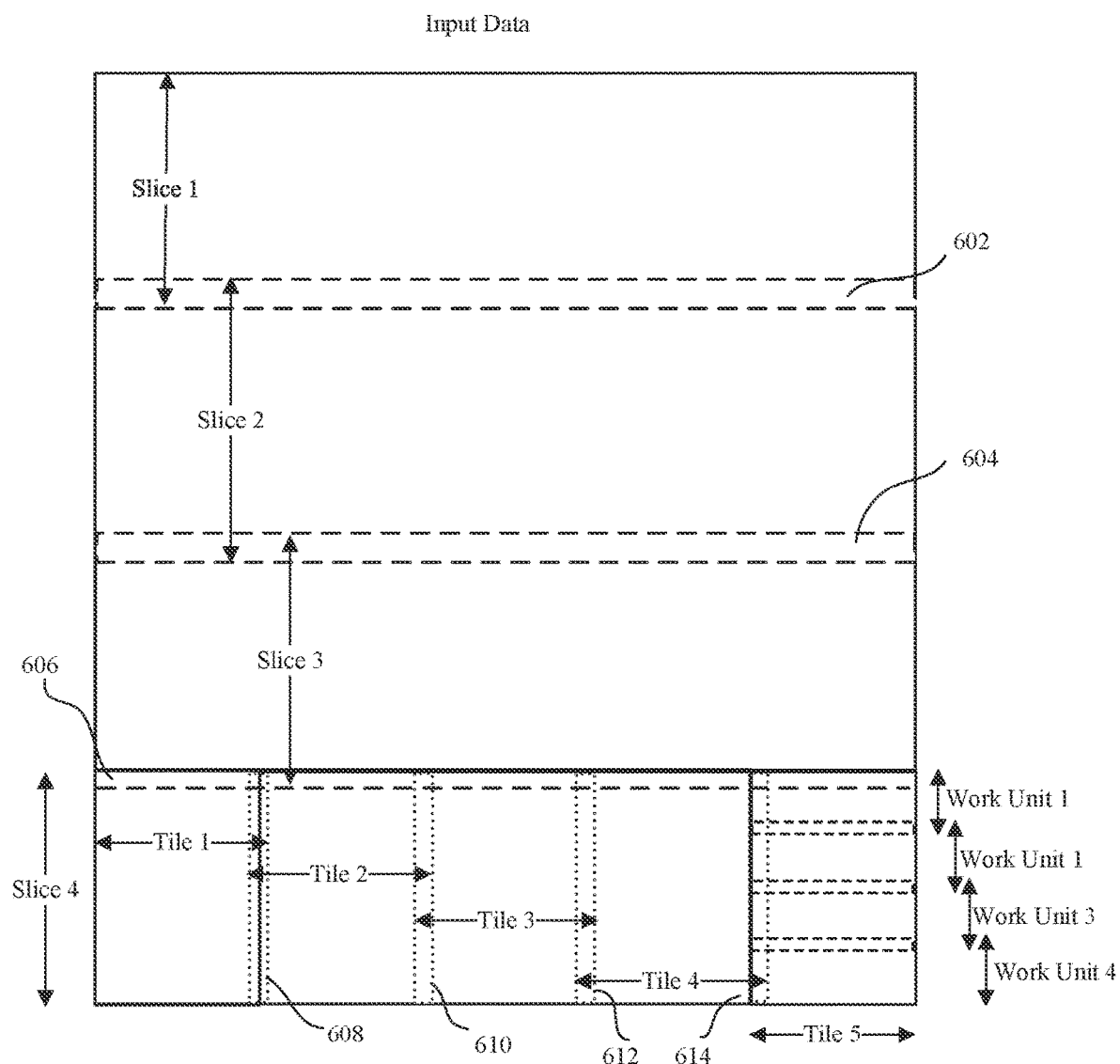
FIG. 6 is a conceptual diagram illustrating segmenting the input data into slices, tiles and work units, according to one embodiment.

In the loop for each convolution group is a processing loop for a slice of the input data. The entire input data for a convolution operation is segmented into multiple strips of slices in an overlapping manner, as shown in FIG. 6. The overlapping portions 602, 604, 606 are parts of the input data that are overfetched in two adjacent slices to provide spatial support for a corresponding kernel. The second outermost loop performs convolution operation for each slice in the input data. Within the loop for a slice is a processing loop for a tile of the slice. Each slice is segmented into a plurality of tiles, as shown in FIG. 6. The overlapping portions 608, 610, 612, 614 are parts of the input data in slice 4 that are overfetched in two adjacent tiles to provide spatial support for a corresponding kernel. The rightmost tile will typically have a width smaller than other tiles of the slice. In one embodiment, input data for each tile is loaded onto data buffer 318 in a read cycle and reused for operations in processing loops for the tile. In the processing loop for the tile is a processing loop for a work unit. Each tile is segmented into multiple work units as shown in FIG. 6. A work unit is a portion of the input data having a size that produces output values that fit into accumulator 414 of neural engine 314 during a single cycle of the computation core 416. Although the shape of each work unit is shown as a horizontal strip in FIG. 6, the shape of the work unit can be different depending on the shape and size of the tile. The work units also have overlapping parts that represent overfetched data to provide support for a corresponding kernel. Especially, work units for the last tile of a slice may have a shape of a vertical strip if the tile is tall. In one or more embodiments, the size of each work unit is 256 bytes. In such embodiments, for example, work units be shaped to one of 16×16, 32×8, 64×4, 128×2 or 256×1 dimension.

For each work unit, an internal processing loop may be provided for an output channel group (OCG). The number of output channels produced for a given work unit by a single cycle of the computation core 416 is referred to as an OCG. Depending on operation modes, each neural engine 314 may process output data of different numbers of output channels (e.g., 8 channels, 32 channels) for a single load of input data into its input buffer circuit 402.

For each output channel group, an internal processing loop may be provided for an input channel (Cin). If an input stride is implemented to skip certain input data, loops for sub-input channels (Sub-Cin) may be provided within the processing loop for the input channel (Cin).

For each input channel or each sub-input channel, internal loops are provided for processing horizontal spatial support for a kernel and the vertical spatial support within each horizontal spatial support. The spatial support refers to the input data for convolution with the kernel, and includes overfetched input data for performing convolution at the edges of the input data.

Overfetch refers to fetching additional input data in current slice, tile or work unit so that proper dimension of input data can be provided for convolution with a kernel. In one or more embodiments, overfetch is performed vertically between slices to obtain additional rows of input data (shown as overlapping portions 602, 604, 606 in FIG. 6), horizontally between tiles to obtain additional columns of input data (shown as overlapping portions 608, 610, 612, 614 in FIG. 6), and vertically between work units within a tile to obtain additional rows of input data.

For each spatial support for the kernel, an internal processing loop for an output channel (OC) is provided to generate output data for each output channel (Cout). In cases where output stride implements a spatial upsampling, an additional inner loop for processing each sub-output channel is provided. Loading of kernel coefficients and MAC operations are performed within the loop for the output channel (OC) or sub-output channel if an output stride is implemented, to generate output data for the output channel (OC) or sub-output channel.

The nested loop structure of FIG. 5 is merely illustrative. Loops may be omitted, added or structured differently depending on various factors. For example, if only a single convolution group is used, the outermost loop may be removed. Further, the loop structure for the horizontal spatial support and the vertical spatial support may be reversed.

In one or more embodiments, the operations associated dividing the input space into smaller units and processing these smaller units as described above with reference to FIGS. 5 and 6 are performed by rasterizers 714, 718, 720, 722 in various components of neural processor circuit 218. A rasterizer is a circuit in various components of neural processor circuit 218 that keeps track of the segment of the input/output data (e.g., group, work unit, input channel, output channel) and instructs the components of neural processor circuit for proper handling of the segment of the input data. For example, rasterizer 720 in buffer DMA 320 tracks tiles and slices received from system memory 230 while rasterizer 718 in data buffer 318 broadcasts in sequence work units for processing by the neural engines 314. Rasterizer 722 in kernel DMA 324 determines which kernels are to be received and distributed to neural engines 314, while rasterizers 714 in neural engines 314 operate shifters 410 in input buffer circuits 402 to forward correct portions 408 of input data to MAC 404, and send the finished output data 328 to the data buffer 318.

Figure 7:
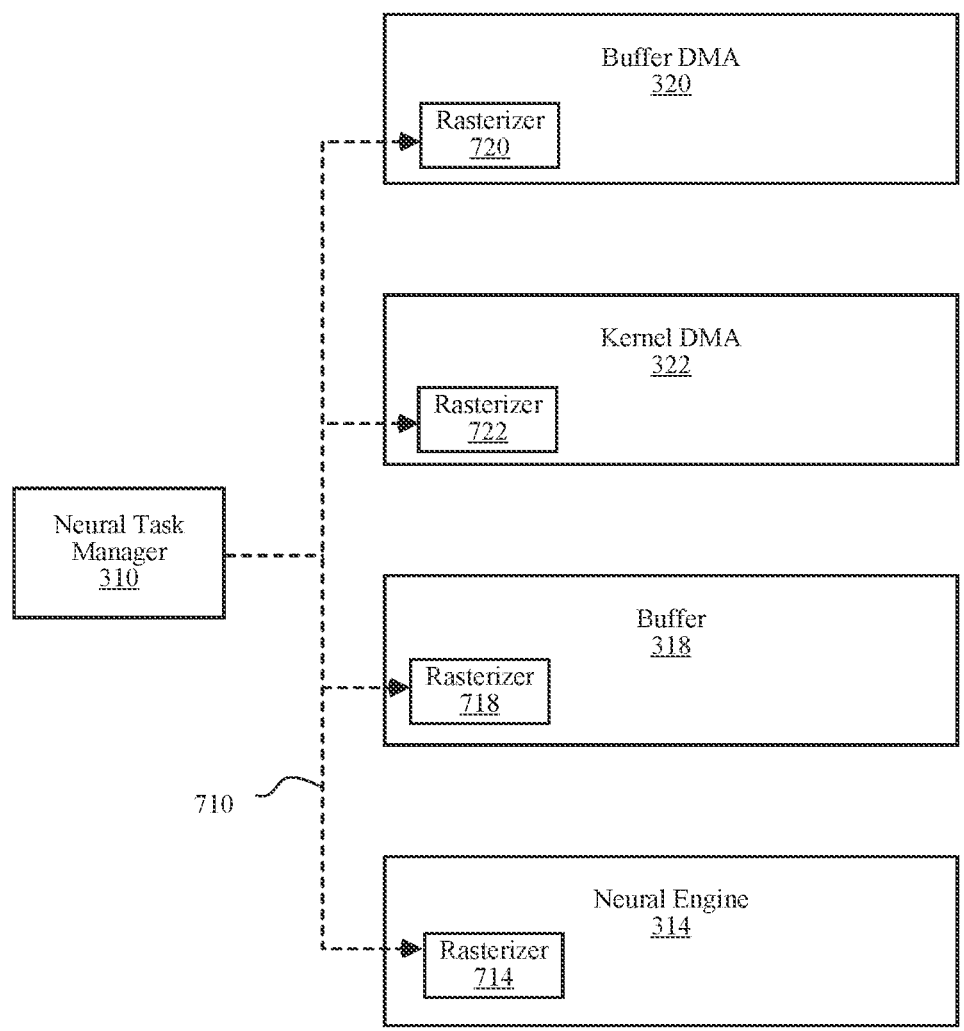
FIG. 7 is a diagram illustrating programming of rasterizers in components of the neural processor circuit, according to one embodiment.

FIG. 7 is a diagram illustrating programming of rasterizers 714, 718, 720, 722 in components 314, 318, 320, 322 of the neural processor circuit 218, according to one embodiment. To perform their functions, each of rasterizers 714, 718, 720, 722 receives task information 710 (e.g., configuration data) indicating how the input data and/or kernel data are to be segmented and to be handled by each component of the neural processor circuit 218. The task information includes information about particulars of the current layer (e.g., dimensions of input and output data, dimension of an associated kernel, types of padding at the boundaries of input data). Rasterizers 714, 718, 720, and 722 may also receive constraints on their operations (e.g., whether to allow or disallow tile width over a threshold).

By providing rasterizers in different components of neural processor circuit 218, overhead in data transmitted between the components of the neural processor circuit 218 may be reduced. If a single central rasterizer is provided to control different components of the neural processor circuit 218, kernel data, input data, and output data transmitted between the components may be needed in these data to identify associated position in the loops of the task such as convolution group, tile, slice, work unit, input channel and output channel. By using distributed rasterizers, no separate metadata is needed to transmit the kernel data, input data and output data among components of the neural processor circuit 218.

Example Process at Neural Engine Architecture

Figure 8:
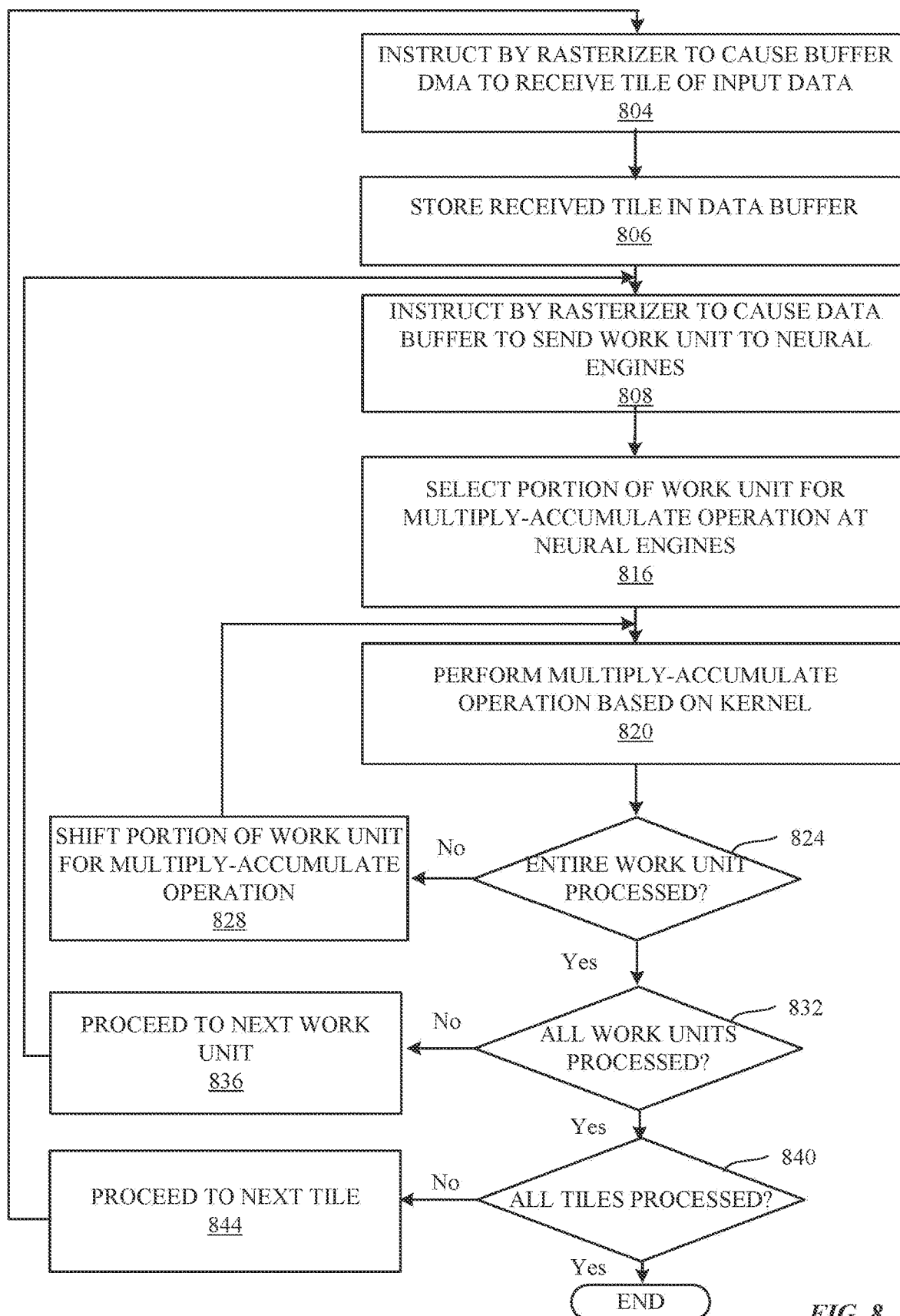
FIG. 8 is a flowchart illustrating a method of processing input data in a neural processor circuit, according to one embodiment.

FIG. 8 is a flowchart illustrating a method of processing input data in neural processor circuit 218, according to one embodiment. The method may include different and/or additional steps, or the steps may be in different orders.

After neural task manager 310 programs rasterizers 714, 718, 720, 722, the process of operating buffer DMA 320 is initiated by rasterizer 720 instructing 804 buffer DMA 320 to cause buffer DMA 320 to receive a tile of input data from system memory 230. The tile received by buffer DMA 320 is stored 806 in data buffer 318.

Rasterizer 718 in data buffer 318 then instructs 808 data buffer 318 to send a work unit to one or more neural engines 314. The work unit is then stored in input buffer circuits 402 of the one or more neural engines 314.

In one or more embodiments, input buffer circuit 402 selects 816 a portion of work unit to be sent to MAC 404 to perform multiply-accumulate operation. Then MAC 404 performs 820 multiply-accumulate operations on the selected portion of the work unit using a corresponding kernel. Then it is determined 824 if the entire work unit is processed at one or more neural engines 314. If not, the selected portion of the work unit is shifted 828 by shifter 410 and returns to perform 820 another round of multiply-accumulate operations.

If it is determined 824 that the entire work unit was processed, then it proceeds to determine 832 if all work units in the tile was processed. If not, then the process proceeds 836 to the next work unit by having data buffer 318 send 808 a next work unit to one or more neural engines 314, and repeats the subsequent processes.

If it is determined 832 that all work units in the tile was processed by the neural engines 314, the process proceeds to determine 840 whether all tiles for the input data were processed. If not, the process proceeds 844 to a next tile by having rasterizer 720 instructs 804 buffer DMA 320 to receive a next tile from system memory 230 and repeats the subsequent processes.

If it is determined 840 that all tiles of the input data are processed, then the process ends for the current input data. Then, the process may be repeated to process the next input data or proceed to the next task.

Embodiments of the process as described above with reference to FIG. 8 are merely illustrative. Further loops may be embodied, as described above with reference to FIG. 5. Moreover, sequence of the process may be modified or omitted.

Example Neural Task Manager Architecture

Figure 9:
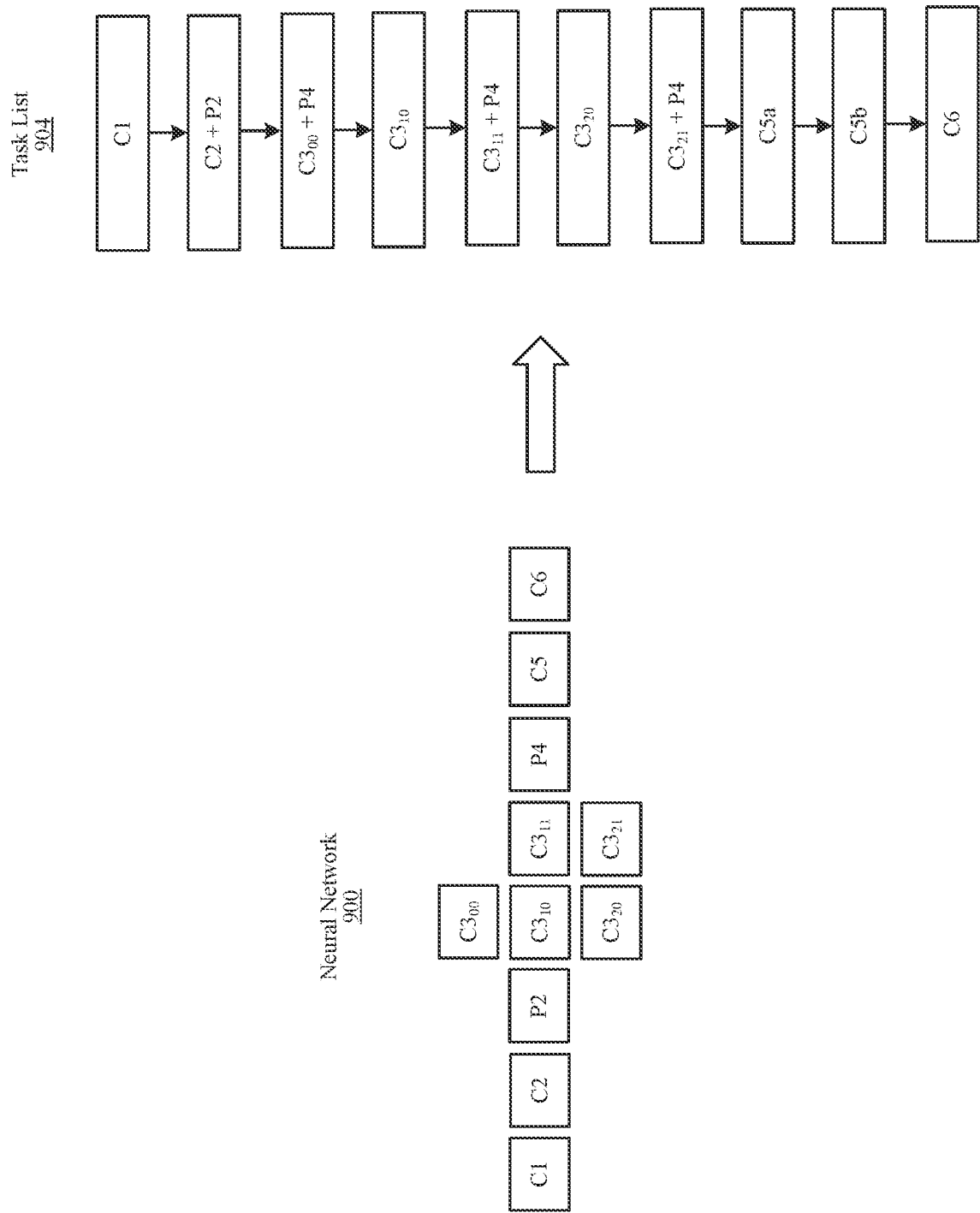
FIG. 9 is a schematic block diagram illustrating a neural network represented by a list of tasks, according to one embodiment.

A neural network may include network layers or sub-layers that are instantiated or implemented as a series of tasks executed by the neural processor circuit 218. FIG. 9 is a schematic block diagram illustrating a neural network 900 represented by a list 904 of tasks, according to one embodiment. The neural network 900 includes network layers (or sub-layers) including convolution layers C1, C2, C3 (including sub-layers C300, C310, C311, C320, and C321), C5, and C6, and pooling layers P2 and P4. The neural network 900 is an example of a neural network architecture that may be instantiated by the neural processor circuit 218. That is, when the neural network 900 is converted into the task list 904 to become executable by the neural processor circuit 218. Other types of neural network architectures with different types of network layers or orders of network layers may also be instantiated by the neural processor circuit 218.

The neural network 900 is converted, such as by the CPU 208, to the task list 904. The task list 904 includes a linear link-list defining a sequence of tasks including task C1, task C2+P2, task $C3_{00}$+P4, task $C3_{10}$, task $C3_{11}$+P4, task $C3_{20}$, task $C3_{21}$+P4, task $C5_a$, task $C5_b$, and task C6. Each task is associated with a task descriptor that defines a configuration of the neural processor circuit 218 to execute the task. Each task may correspond with a single network layer of the neural network 900, a portion of a network layer of the neural network 900, or multiple network layers of the neural network 900. For example, the task C1 corresponds with the single network layer C1, the task C2+P2 corresponds with multiple network layers C2 and P2, and the tasks $C5_a$ and $C5_b$ each correspond with a portion of the network layer C5. The neural processor circuit 218 instantiates the neural network 900 by executing the tasks of the task list 904 under the control of the neural task manager 310.

Figure 10:
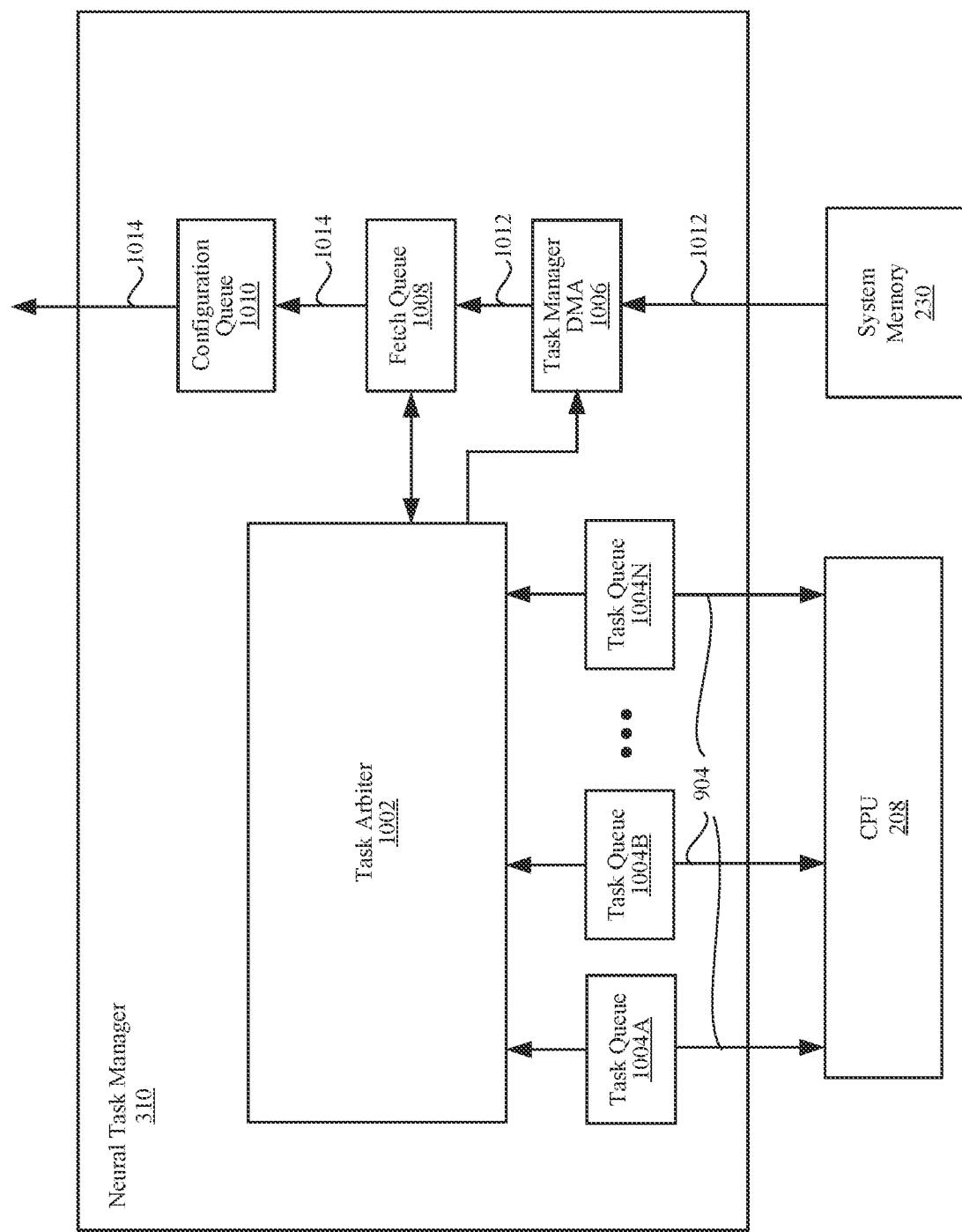
FIG. 10 is a block diagram illustrating the neural task manager, according to one embodiment.

FIG. 10 is a block diagram illustrating the neural task manager 310, according to one embodiment. The neural task manager 310 manages the execution of tasks for one or more neural networks 900 by the neural processor circuit 218. The neural task manager 310 may include, among other components, a task arbiter 1002, task queues 1004A through 1004N (hereinafter collectively referred as "task queues 1004" and individually also referred to as "task queue 1004"), a task manager direct memory access (DMA) 1006, a fetch queue 1008, and a configuration queue 1010. The neural task manager 310 may include other components not illustrated in FIG. 10.

The task arbiter 1002 is a circuit or a combination of circuit and firmware that selects tasks from the task queues 1004 for execution by the neural processor circuit 218. The task arbiter 1002 dequeues tasks from the task queues 1004, and places tasks in the configuration queue 1010. While a task is in a configuration queue, it is committed to execution and the neural processor circuit performs a prefetch for input data and kernel data before the task is executed by other components of the neural processor circuit 218. For example, the task arbiter 1002 may perform fixed-priority arbitration between multiple task queues 1004, and select the task from the task queues 1004 with the highest priority for retrieval of a task descriptor 1012 from the system memory 230 by the task manager DMA 1006.

The neural task manager 310 may include one or more task queues 1004. Each task queue 1004 is coupled to the CPU 208 and the task arbiter 1002. Each task queue 1004 receives from the CPU 208 a reference to a task list 904 of tasks that when executed by the neural processor circuit 218 instantiates a neural network 900. The reference stored in each task queue 1004 may include a set of pointers and counters pointing to the task list 904 of task descriptors 1012 in the system memory 230. Each task queue 1004 may be further associated with a priority parameter that defines the relative priority of the task queues 1004. The task descriptor 1012 of a task specifies a configuration of the neural processor circuit 218 for executing the task.

The task manager DMA 1006 is coupled to task arbiter 1002, the system memory 230, and the fetch queue 1008. The task manager DMA 1006 includes a read circuit that receives task descriptors 1012 of tasks from a source (e.g., system memory 230) for storing in the fetch queue 1008. For example, the task arbiter 1002 selects a task queue 1004 according to the priorities of the task queues 1004, and uses the task list 904 referenced by the selected task queue 1004 to control the task manager DMA 1006 to select the task descriptor 1012 of a task.

The fetch queue 1008 is a single entry queue that stores a task descriptor 1012 of a task that is pending to commit for execution. The fetch queue 1008 is coupled to the task manager DMA 1006 to receive the task descriptor 1012 from the system memory 230, and provides the task descriptor 1012 to the configuration queue 1010 or the configuration data 1014 extracted from the task descriptor 1012 to the configuration queue 1010.

The configuration queue 1010 holds configuration data 1014 of multiple tasks that have been committed for execution. When a task is in the configuration queue 1010, the kernel DMA 324 may fetch kernel data from the system memory 230 to store in the kernel extract circuit 432 of neural engines 314, and the buffer DMA 320 may fetch input data from the system memory 230 to store in the data buffer 318. To execute the task, the kernel extract circuit 432 provides the prefetched kernel data to the MAC 404 of the neural engine 314, and the data buffer 318 provides the prefetched input data to the MAC 404 of the neural engine 314. In some embodiments, the configuration queue 1010 may include multiple queues that holds configuration data 1014 extracted from the committed task descriptors 1012. As discussed in greater detail in connection with FIG. 13, the configuration queue 1010 is further coupled to other components of the neural processor circuit 218 to configure the neural processor circuit 218 according to the configuration data 1014.

Figure 11:
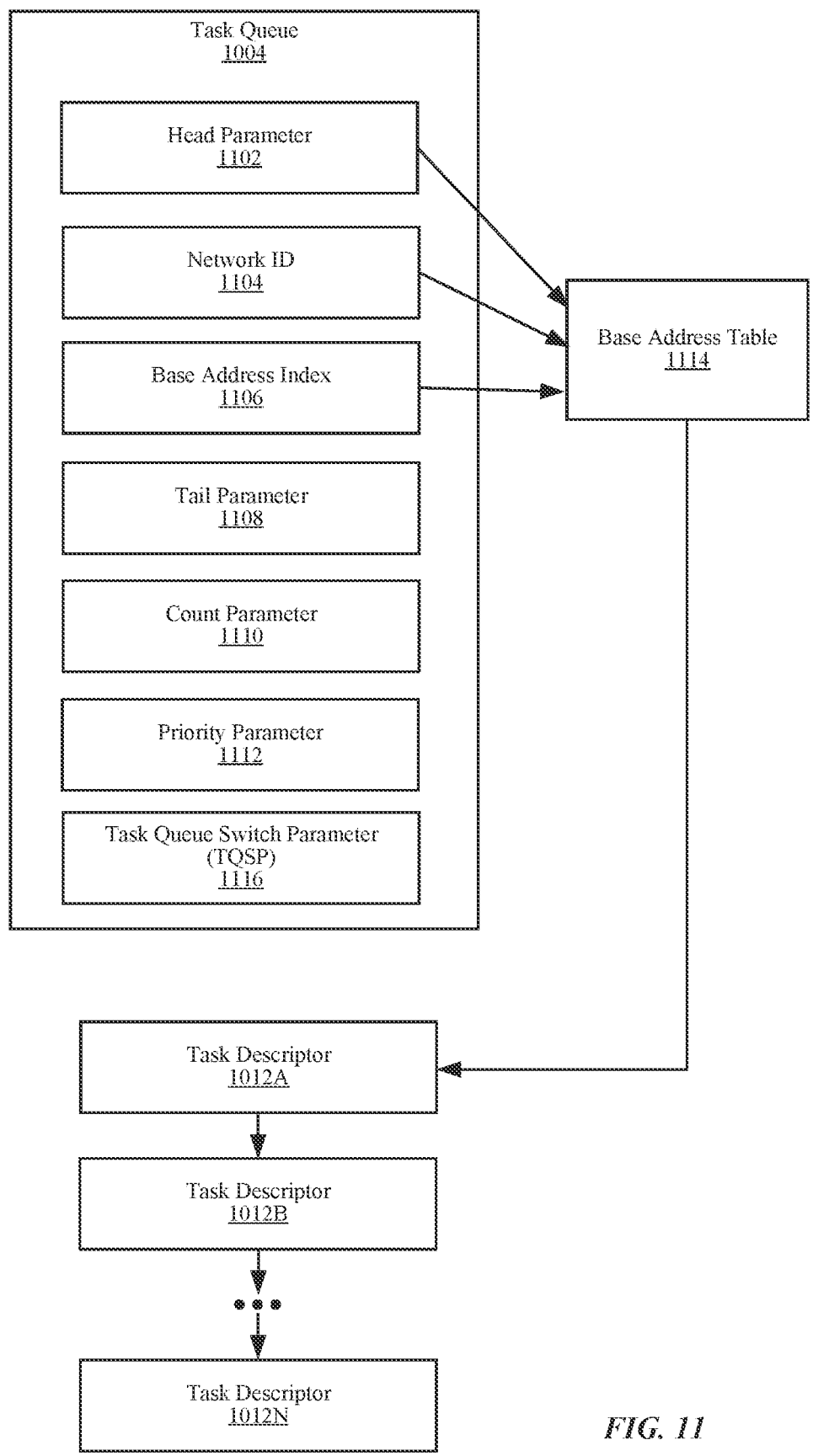
FIG. 11 is a diagram illustrating retrieval of task descriptors using a task queue, according to one embodiment.

FIG. 11 is a diagram illustrating retrieval of task descriptors 1012 using a task queue 1004, according to one embodiment. The task queue 1004 includes a reference, such as a set of pointers, to the task descriptors 1012A through 1012N stored in the system memory 230. To that end, the task queue 1004 may include a memory storing a head parameter 1102, a network identifier (ID) 1104, a base address index 1106, a tail parameter 1108, a count parameter 1110, a priority parameter 1112, and a task queue switch parameter 1116. The head parameter 1102 is a pointer to a location of the system memory 230 storing the task descriptor 1012A at the head of the task queue 1004. The network ID 1104 identifies the neural network 900 of the task descriptor 1012 at the head of the task queue 1004, and the base address index 1106 is an index to a base-address table 1114 tagged with the network ID 1104 of the task descriptor 1012A at the head of the task queue 1004. The count parameter 1110 defines the number of task descriptors 1012 in the task queue 1004. The priority parameter 1112 defines the priority of the task queue 1004, which is used by the task arbiter 1002 to select between multiple task queues 1004. The task queue switch parameter 1116 indicates whether the task queue 1004 was interrupted due to a task switch and needs to be completed.

When a particular task queue 1004 is selected (e.g., according to the priority parameter 1112), the task arbiter 1002 references the head parameter 1102, the network ID 1104, the base address index 1106, and the base address table 1114 to retrieve a task descriptor 1012 from the system memory 230, and places the task descriptor 1012 into the fetch queue 1008 to initiate commitment of the task for execution. In each configuration period, the task arbiter 1002 may continue to place a task descriptor 1012 into the fetch queue 1008 according to the order of tasks defined by the task list 904 of the task queue 1004, such as by retrieving the next task descriptor 1012B, and so forth.

Figure 12:
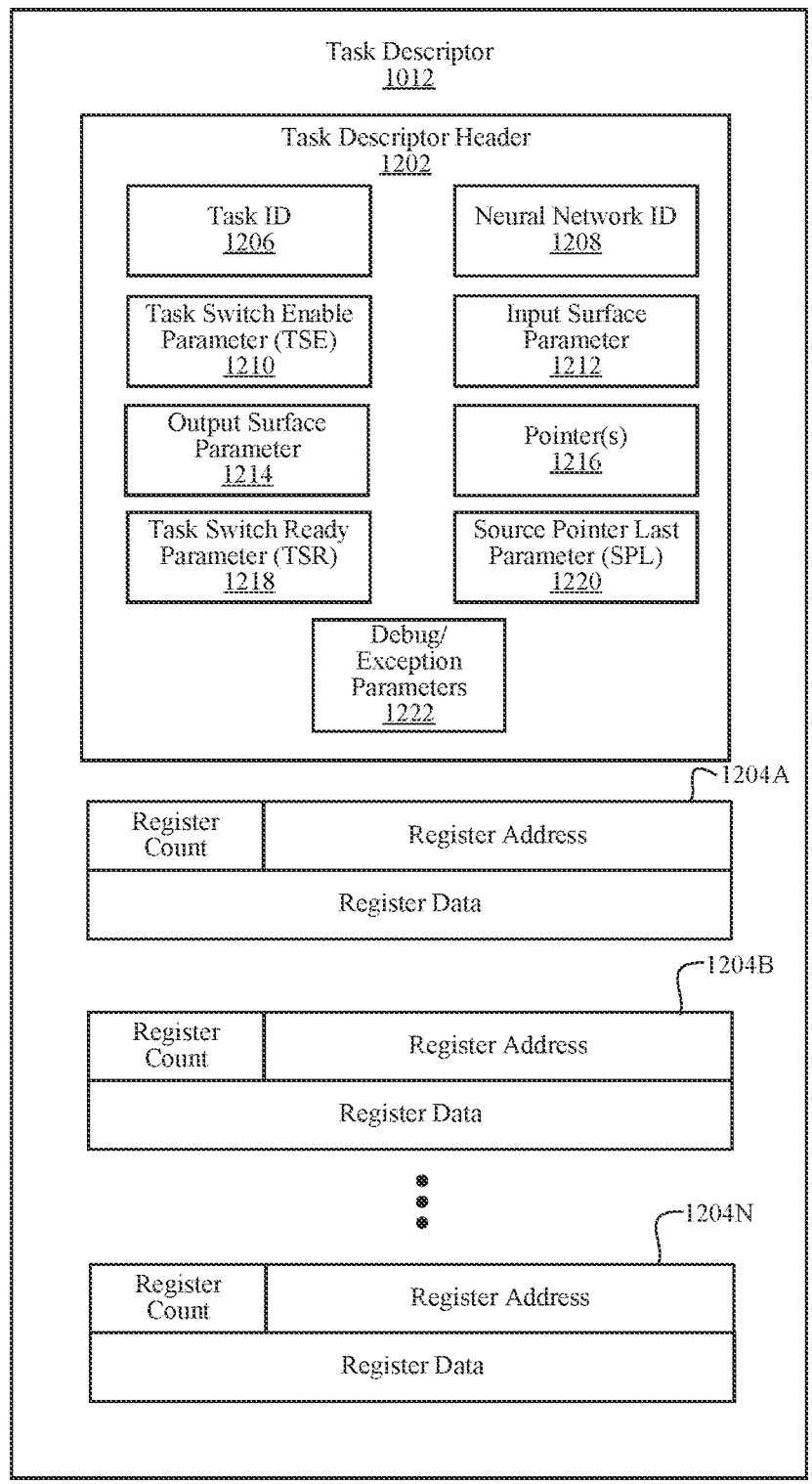
FIG. 12 is a diagram illustrating a task descriptor, according to one embodiment.

FIG. 12 is a diagram illustrating a task descriptor 1012, according to one embodiment. The task arbiter 1002 places the task descriptor 1012 in the fetch queue 1008 from system memory 230, which is then transferred to the configuration queue 1010. The highest priority (e.g., first in) task descriptor 1012 in the configuration queue 1010 is used to configure the neural processor circuit 218 for execution during the configuration period. The task descriptor 1012 includes configuration data 1014 including a task descriptor header 1202 and address data 1204A through 1204N (hereinafter referred as "address data 1204"). The task descriptor header 1202 includes configuration data 1014 that configures various operations of the neural task manager 310, including operations related to task selection and task switching. For example, the task descriptor header 1202 may be parsed by the task arbiter 1002 to extract configuration data 1014 that programs the neural task manager 310 and other components of the neural processing circuit 218. The task descriptor header 1202 may include a task identifier (ID) 1206 that identifies the task, a neural network identifier (ID) 1208 that identifies a neural network 900 instantiated by the task, a task switch parameter 1210 defining whether the neural task manager 310 should initiate a task switch (e.g., to execute a task of a different task queue 1004) after execution of the task, an input surface parameter 1212 defining whether the input data for the task should be retrieved from the system memory 230 or the data buffer 318, an output surface parameter 1214 defining whether the output data of the task should be stored in the system memory 230 or the data buffer 318, various (e.g., base address) pointers 1216 to facilitate the programming of the neural processor circuit 218, and one or more debug/exception parameters 1222 that control event, exception, or debug logging. The task descriptor header 1202 may also include additional parameters related to task switching, such as a task switch ready (TSR) parameter 1218 that defines whether the neural task manager 310 can task switch after execution of the task, and a source pointer last (SPL) parameter 1220 that indicates, after returning to an interrupted task queue 1004, the task is the last task with input data stored in the system memory 230. Parameters related to task switching will be further described with reference to task switching (e.g., see descriptions related to FIGS. 15-17).

Each instance of address data 1204A through 1204N (collectively or individually referred to as "address data 1204") defines an address and data payload pair used to program the components of the neural processor circuit 218. The data payload may include input data and kernel data used to execute the task. For example, each instance of address data 1204 includes register data defining the data payload, a register address defining a destination memory location of the neural processing circuit 218 for receiving the register data, and a register count defining a number of consecutive memory locations (e.g., registers) to be written with the register data. In some embodiments, the register address is combined with the base address stored in the header 1202 to define the full address of each memory location. If the task descriptor 1116 is generated at compile time, then the actual run time addresses may not be known. The base address table 1114 is used avoid duplicating or updating all task descriptors with dynamically assigned addresses.

Figure 13:
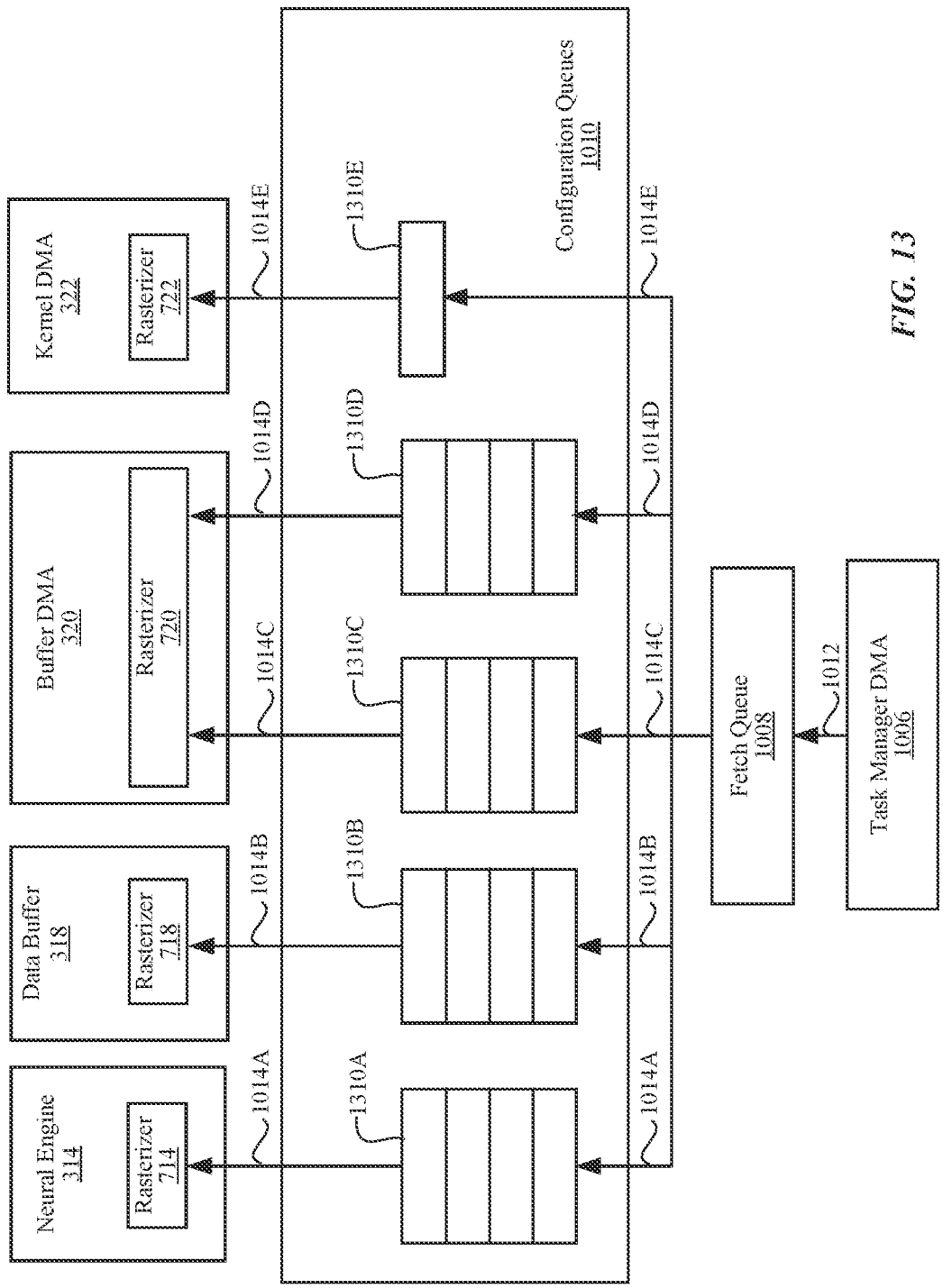
FIG. 13 is a block diagram illustrating a fetch queue and a configuration queue of a neural task manager, according to one embodiment.

FIG. 13 is a block diagram illustrating the fetch queue 1008 and configuration queue 1010, according to one embodiment. The configuration queue 1010 is coupled to the fetch queue 1008, which is coupled to the system memory 230 via the task manager DMA 1006. The configuration queue 1010 is further coupled to the rasterizer 714 of one or more neural engines 314, the rasterizer 718 of the data buffer 318, the rasterizer 720 of the buffer DMA 320, and the rasterizer 722 of the kernel DMA 324. The fetch queue 1008 stores a task descriptor 1012 (e.g., including the task descriptor header 1202 and the address data 1204A through 1204N) for a task that is pending and not committed to execution. The fetch queue 1008 reduces the latency of reading the next task descriptor 1012 into the configuration queue 1010 from the system memory 230. The fetch queue 1008 stores the highest priority task descriptor 1012 as determined by the task arbiter 1002. The task arbiter 1002 may replace the task descriptor 1012 stored in the fetch queue 1008 if a higher priority task descriptor 1012 has been has been enqueued (e.g., from a higher priority task queue 1004). The task descriptor 1012 in the fetch queue 1008 does not initiate an input data or kernel prefetch, and does not affect task queue priorities, pointers, or counters. As such, a task descriptor 1012 in the fetch queue 1008 may be readily replaced by a higher priority task descriptor 1012 by writing the higher priority task descriptor 1012 into the fetch queue 1008. When a task descriptor 1012 stored in the configuration queue 1010 is executed by the neural processor circuit 218, the task descriptor 1012 stored in the fetch queue 1008 is transferred to the configuration queue 1010, and another task descriptor 1012 of a subsequent task may be stored in the fetch queue 1008.

The configuration queue 1010 stores task descriptors 1012 of tasks committed for execution by the neural processor circuit 218. In some embodiments, the configuration queue 1010 includes multiple separate queues 1310 that each store a portion of the configuration data 1014 (including configuration data 1014A through 1014E) extracted from the task descriptor 1012. Furthermore, the queues 1310 are each coupled to a respective component of the neural processor circuit 218 for programming the component with the configuration data 1014. Through operation of the configuration queue 1010, the neural task manager 310 programs the rasterizers 714, 718, 720, 722 to perform the functionality discussed above in FIGS. 7 and 8. For example, a queue 1310A is coupled to the rasterizers 714 of the neural engines 314 to provide configuration data 1014A that controls the operations of the shifters 410 in the input buffer circuits 402 to forward correct portions 408 of input data to MAC 404, and send the finished output data 328 to the data buffer 318. The queue 1310B is coupled to the rasterizer 718 of the data buffer 318 to provide configuration data 1014B that controls the broadcasting of input data (e.g., work units) by the data buffer 318 for processing by the neural engines 314. The queue 1310C is a read queue that is coupled to the rasterizer 720 of the buffer DMA 320 to provide configuration data 1014C that controls the buffer DMA 320 to retrieve input data (e.g., a tile) from system memory 230 and store the input data in the data buffer 318. The queue 1310D is a write queue that is coupled to the rasterizer 720 of the buffer DMA 320 to provide configuration data 1014D that controls the buffer DMA 320 to store output data in the system memory 230. The queue 1310E is coupled to the rasterizer 722 of the kernel DMA 322 to provide configuration data 1014E that controls which kernels are to be received and distributed to neural engines 314. In some embodiments, a task descriptor 1012 or configuration data 1014 stored in the configuration queue 1010 cannot be replaced and will be executed in a first in, first out (FIFO) order.

Example Process at Neural Task Manager Architecture

Figure 14:
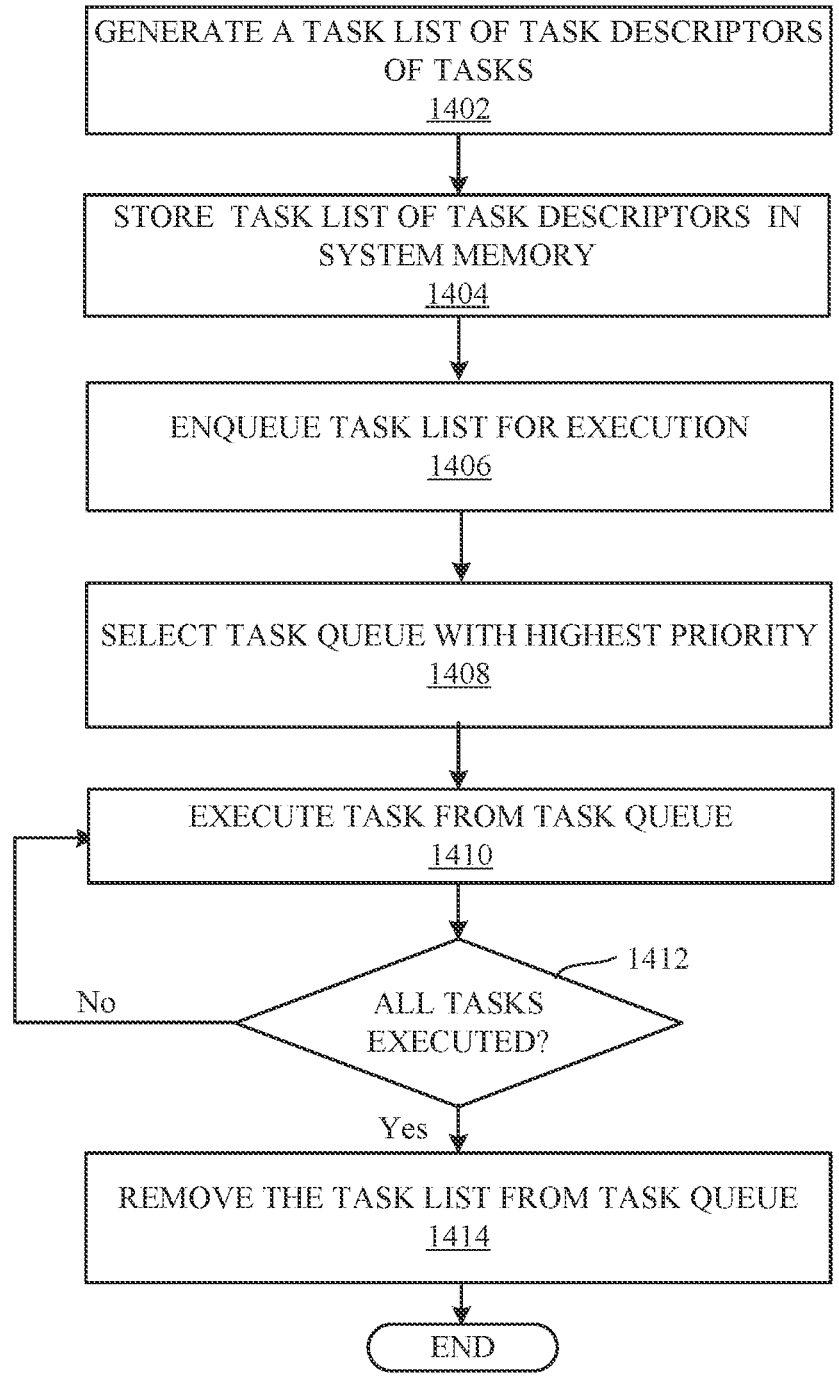
FIG. 14 is a flowchart illustrating a method of managing tasks in a neural processor circuit, according to one embodiment.

FIG. 14 is a flowchart illustrating a method of managing tasks in the neural processor circuit 218, according to one embodiment. The method may include different and/or additional steps, or the steps may be in different orders.

The CPU 208 generates 1402 a task list 904 of task descriptors 1012 of tasks that when executed by the neural processor circuit 218 instantiates a neural network 900. For example, the CPU 208 may receive input data for a machine learning operation from the image sensor 202, the system memory 230, the persistent storage 228, the network interface 210, or some other components. The machine learning operation may include an inferencing operation, or a training operation. The neural network 900 may include kernel data and a neural network architecture including network layers. The input data is applied to the neural network 900 to perform the machine learning operation. The kernel data and network layers of the neural network 900 may be computed in a machine learning training process. The CPU 208 performs a compile operation (offline or on-the-fly) to turn a neural network description 900 into a linked list of task descriptors 1012 referred to herein as the task list 904. Each task is defined by a task descriptor 1012, and when executed by the neural processor circuit 218 instantiates a single network layer, multiple network layers, or a portion of a network layer. Each task descriptor 1012 of a task includes configuration data 1014, such as the task descriptor header 1202 and the address data 1204 defining neural processor circuit 218 address and data payload pairs. The data payload may include the kernel data of the neural network 900 and the input data. The configuration data 1014 further includes instructions that configure operation of the rasterizers 714, 718, 720, and 722 to execute the task.

The CPU 208 stores 1404 the task list 904 of task descriptors 1012 in the system memory 230. In some embodiments, the CPU 208 or another CPU external to the electronic device 100 generates the task descriptors 1012 and stores the task descriptors 1012 in the persistent storage 228 or some other non-volatile memory. The task descriptors 1012 are loaded along with the kernel data and input data in the system memory 230 for use by the neural processor circuit 218. The CPU 208 may be coupled to the system memory 230 via the bus 232 and the memory controller 222.

The task list 904 may include a set of pointers that reference the locations of the task descriptors 1012 in the system memory 230. Furthermore, the CPU 208 may update parameters of the task descriptors 1102 such as memory addresses or the network ID. For example, the task list 904 may include a head parameter 1102 and a tail parameter 1108 respectively defining a beginning register address and an end register addresses of the system memory 230 where multiple tasks descriptors 1012 are stored. In some embodiments, the references to the register addresses in the task list 904 may be partial addresses, and a base address table 1114 is used to define the full reference addresses to the system memory 230. In some embodiments, the CPU 208 may patch absolute addresses as necessary. The CPU 208 may further configure the neural processor circuit 218 by setting its base address registers.

The task arbiter 1002 of the neural task manager 310 enqueues 1406 the task list 904 for execution by the neural processor circuit 218. For example, the neural task manager 310 includes multiple task queues 1004A through 1004N. The task queues 1004 may each store a reference to a task list 904. Furthermore, the task queues 1004 are prioritized for execution according to the priority parameters 1112 of the task lists 904 referenced by the task queues 1004.

In some embodiments, the CPU 208 performs a general configuration of the neural processor circuit 218 to execute the task. The CPU 208 may further start the neural processor circuit 218 if the neural processor circuit 218 is not already running.

The task arbiter 1002 selects 1408 a task queue with highest priority for execution. For example, the task arbiter 1002 in each programming period selects a task queue 1004 based a comparison of priority parameters 1112 of the task queues 1004 or the task lists 904 of the task queues 1004, and executes tasks from the task list 904 from the highest priority task queue 1004.

The neural processor circuit 218 executes 1410 a task from the selected task queue. For example, the neural processor circuit 218 performs the method of FIG. 8 to execute the task. The configuration queue 1010 of the neural task manager 310 may provide the configuration data 1014 (or task information 710) to the rasterizers 714, 718, 720, 722 of the neural processor circuit 218 to program the neural processor circuit 218 to execute the task, as shown in FIG. 7. Furthermore, the execution of the task may include processing of the prefetched kernel data and input data while the task was in the configuration queue 1010. The execution of each task may include multiple processing loops for handling the input data as shown in FIGS. 5 and 6. The task arbiter 1002 may dequeue the task from the configuration queue 1010 after execution of the task.

In some embodiments, to execute the task, the task arbiter 1002 controls the task manager DMA 1006 to retrieve the task descriptor 1012 of the task of the task list 904, and store the task descriptor 1012 in the fetch queue 1008. After execution of a previously committed task, the task arbiter 1002 may dequeue the executed task by removing the task descriptor or configuration data of the task from the configuration queue 1010. The task descriptor 1012 or extracted configuration data 1014 of the current task is then placed in the configuration queue 1010 from the fetch queue 1008. When the task is in the configuration queue 1010, the neural processor circuit 218 may initiate a prefetch operation by the kernel DMA 324 for kernel data from the system memory 230 to the kernel extract circuit 432, and a prefetch operation by the buffer DMA 320 for input data from the system memory 230 to the data buffer 318.

If a different task queue has a higher priority, a task switch to the task queue with the higher priority may be performed when possible. To perform a task switch (e.g., to another machine learning operation), the task arbiter 1002 replaces a task in the fetch queue 1008 with another task descriptor referenced in a different task queue 1004. The task arbiter 1002 may resume the interrupted machine learning operation defined by the task list 904 after completion of the task switch by storing the replaced task into the fetch queue 1008.

In some embodiments, the CPU 208 determines 1408 a priority parameter 1110 of the task list 904 to select a task queue. The priority parameter 1110 defines the priority of the tasks of the machine learning operation relative to other tasks of other machine learning operations executed by the neural processor circuit 218. The CPU 208 may facilitate the execution of multiple machine learning operations. The machine learning operations may be different, such as by using different input data or different neural network architectures and kernel data. The CPU 208 may determine the priority parameter of the task list 904 programmatically, or based on user input. The task descriptor 1012 referenced by the task queue 1004 with the highest priority may be selected for execution. The priority of a task queue is either determined by the CPU 208, or dynamically by information from a previously executed task descriptor.

The task arbiter 1002 determines 1412 whether all tasks of the task list 904 have been executed. If a task of the task list 904 has not been executed, the process returns to step 1410, where the task arbiter 1002 executes the unexecuted task of the task list 904.

If each task of the task list 904 has been executed, the task arbiter 1002 removes 1414 the task list 904 from the task queue 1004. In another example, a reference to a task descriptor 1012 of a task may be removed from the task queue 1004 subsequent to execution of the task. The process may end. In another example, the process may return to 1402, where the CPU 208 may continue to generate task descriptors of tasks for other machine learning operations. In that sense, the process may be repeated to place tasks into task queues for execution of machine learning operations by the neural processor circuit 218 according to specified task priorities.

Example Process at Neural Task Manager Task Switching

The neural task manager 310, through the task arbiter 1002, can support task switching between task queues 1004. While the neural processor circuit 218 is executing tasks of a first task list of a first task queue 1004 and prior to execution of each of the tasks in the first task queue 1004, the neural task manager 310 can cause the neural processor circuit 218 to task switch and execute one or more tasks of a second task list in a second task queue 1004. After the one or more tasks of the second task list has been executed, the neural processor circuit 218 may return to unexecuted tasks of the first task list. For example, the neural task manager 310 provides configuration data for a task of the second task list to one or more neural engines 314 for execution. Task switching may occur due to a task queue 1004 having a higher priority parameter 1112 than a task queue 1004 that is being executed. The priority parameter 112 of a task queue 1004 can be determined according to the task urgency, task length, task source, etc. For example, to execute a high priority machine learning operation, the CPU 208 may generate a task list and store a reference to the task list in a task queue 1004 with a higher priority parameter 1112 than a task list of a task queue 1004 that is being executed.

Without a task switch, output data 328 of a task in a task queue 1004 may be stored in the data buffer 318 (e.g., a destination target is in the data buffer 318) and may be used as input data for a subsequent task in the task queue 1004 (e.g., a source target for the subsequent task is in the data buffer 318). However, during a task switch, source targets (e.g., for input data) and destination targets (e.g., for output data 328) may change from the data buffer 318 to the system memory 230. In some embodiments, data is stored in a memory cache (e.g., instead of the system memory 230) between the data buffer 328 and system memory 230 (not shown in FIG. 2). For example, during a task switch from a first task queue 1004 being executed to a second task queue 1004, output data 328 for executed tasks in the first task queue 1004 are stored in the system memory 230, instead of the data buffer 318. In another example, after each of the tasks of the second task queue 1004 are executed, the output data 328 of the tasks of the second task queue 1004 are stored in the system memory 230 and the input data for the remaining tasks in the first task queue 1004 are retrieved from the system memory 230.

As previously described with reference to FIG. 12, task descriptor headers 1202 can include configuration data 1014 that configures behaviors related to task switching. Specifically, the task switch enable parameter 1210 (TSE) defines whether the neural task manager 310 can begin a task switch process after execution of the task (e.g., a task switch process can begin if TSE=1). The input surface parameter 1212, also referred to as the source pointer change parameter (SPC), defines whether the input data for the task should be retrieved from the system memory 230 or the data buffer 318 (e.g., input data is retrieved from the system memory 230 if SPC=1). The output surface parameter 1214, also referred to as a destination pointer change parameter (DPC) defines whether the output data 328 of the task should be stored in the system memory 230 or the data buffer 318 (e.g., the output data 328 is be stored in the system memory 230 if DPC=1).

Task descriptor headers 1202 can also include a task switch ready parameter 1218 (TSR) that defines whether the neural task manager 310 can task switch after execution of the task (e.g., task switch if TSR=1) and a source pointer last parameter 1220 (SPL) that indicates, after returning to an interrupted task queue 1004, the task is the last task with input data stored in the system memory 230. Furthermore, each task queue 1004 can have a task queue switch parameter 1116 (TQSP) that indicates whether the task queue 1004 was interrupted due to a task switch and needs to be completed (e.g., TQSP=1 indicates that the task queue 1004 was interrupted due to a task switch). The neural task manager 310 may also have a global task switch parameter (GTSP) that indicates a task switch is in process (e.g., GTSP=1 indicates a task switch is in progress).

The neural task manager 310 can follow a set of rules that configures the neural task manager 310 to direct a task switch process. These rules can include:

Rule 1: if a task switch request is received and TSE=1 for the task, then GTSP is set to 1, according to an embodiment. A task switch request can be triggered by the task manager 310 after determining that a task or a task queue 1004 has a higher priority parameter 1112 than a current task or current task queue 1004.

Rule 2: if GTSP=1 and DPC=1, then the output data 328 from the executed task is stored to the system memory 230, according to an embodiment.

Rule 3: if GTSP=1 and TSR=1, then TQSP is set to 1 for the current task queue 1004 (i.e., the task queue being executed), GTSP is set to 0, and the task switch can occur, according to an embodiment.

Rule 4: if SPC=1 and TQSP=1, then the input data for the task is retrieved from the system memory 230, according to an embodiment.

Rule 5: if SPL=1, then TQSP is set to 0 for the current task queue 1004, according to an embodiment. In some embodiments, since Rule 5 sets TQSP to zero, for every task with TSR=1, a task with SPL=1 follows later in the task list 904.

Figure 15:
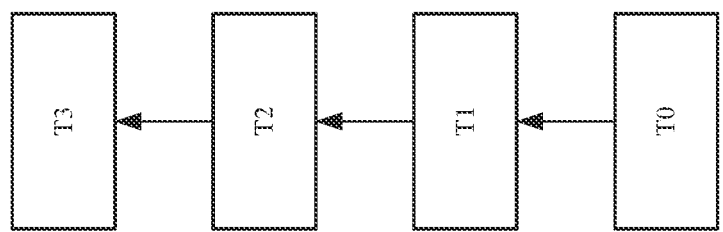
FIG. 15 is an example neural network associated with a task queue that includes multiple tasks, according to one embodiment.

An example task switch is described with reference to FIG. 15. FIG. 15 is an example neural network 900 associated with a task queue 1004 that includes tasks T0-T3, according to one embodiment. In this example, the neural task manager 310 directs the neural processor circuit 218 to execute the tasks in order, starting from task T0 and ending with task T3. Additionally, each task can read input data from the previous task. For example, output data 328 for task T0 can be input data for task T1. This can be done by saving the output data 328 of each task to the data buffer 318. As such, if T0 is the first task in the task list 904, only T0 will receive input data from the system memory 230 (in absence of a task switch request).

In this example, if a task switch occurs between task T1 and T2. The task switch parameter values can include:
T1: TSE=1
 DPC=1
 TSR=1
T2: SPC=1
 SPL=1.

The other task switching parameters may be set to zero. Additional task switch parameter combinations may also allow a task switch between task T1 and T2. For example,
T0: TSE=1
T1: DPC=1
 TSR=1
T2: SPC=1
 SPL=1.

If a task switch request is received while the neural task manager 310 is executing task T1, then the neural task manager 310 can set GTSP to 1, since TSE=1 (see Rule 1). Next, since DPC=1 and the GTSP=1, the neural task manager 310 can direct the output data 328 of T1 to the system memory 230 (see Rule 2). For example, the buffer DMA 320 provides output data 328 from the data buffer 318 to the system memory 230. Next, since TSR=1 and GTSP=1, the neural task manager 310 can set TQSP to 1 for the interrupted task queue 1004 associated with tasks T0-T3, can set GTSP to 0, and can conduct the task switch to a new task queue 1004 (see Rule 3). In doing this, the configuration data 1014 in the configuration queue 1010 may be replaced with configuration data 1014 associated with a task of a new task queue 1004, instead of configuration data 1014 associated with a task of the interrupted task queue 1004.

Since TQSP=1 for the interrupted task queue 1004, the neural task manager 310 can return to the interrupted task queue 1004 (e.g., after finishing the new task queue 1004) so that the neural processor circuit 218 can execute tasks T2 and T3. Since TQSP=1 and SPC=1 for task T2, the neural task manager 310 can read the input data from the system memory 230 (see Rule 4). For example, input data may be saved to the data buffer 318 from the system memory 230. Additionally data may be uploaded from the system memory 230, such as kernel data and configuration data 1014. Notice, the input data can be the output data 328 that was previously saved to the system memory 230 when performing Rule 2. Since SPL=1 for task T2, the neural task manager 310 sets TQSP to 0 (see Rule 5). This can complete the task switching process.

Figure 16:
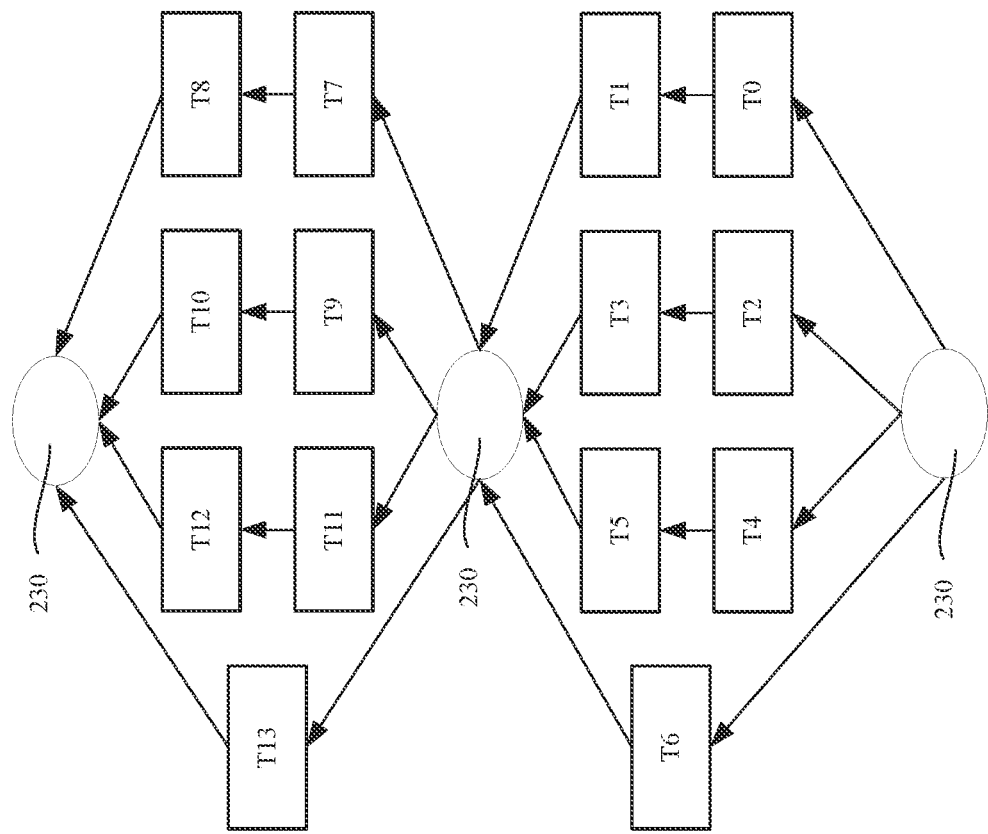
FIG. 16 is another example neural network associated with a task queue that includes multiple tasks, according to one embodiment.

Another example of task switching can be described with reference to FIG. 16. FIG. 16 is an example neural network 900 associated with a task queue 1004 that includes tasks T0-T13, according to one embodiment. In the example of FIG. 16, the neural task manager 310 directs the neural processor circuit 218 to execute the tasks in order, starting from task T0 and ending on task T13. Tasks T0, T2, T4, and T6, each receive their input data from the system memory 230 (note that the input data from the system memory 230 may be uploaded to the data buffer 318 prior to execution). In this example, a task switch occurs between task T6 and T7. Thus, the output data 328 of tasks T1, T3, T5, and T6 are saved to the system memory 230 and the input data for tasks T7, T9, T11, and T13 is retrieved from the system memory 230. In some embodiments, input data for tasks T7, T9, T11, and T13 includes the output data 328 of tasks T1, T3, T5, and T6. Tasks T1, T3, T5, T8, T10, and T12 each read input data from a previous task (e.g., output data 328 of task T0 is input data for task T1). This can be done by saving the output data 328 of each task to the data buffer 318 or to system memory 230.

In this example, a task switch occurs between task T6 and T7. The task switching parameters can include:
T1: TSE=1
 DPC=1
T3: DPC=1
T5: DPC=1
T6: DPC=1
 TSR=1
T7: SPC=1
T9: SPC=1
T11: SPC=1
T13: SPC=1
 SPL=1

All other task switching parameters may be set to zero. Additional task switch parameter value combinations may also allow a task switch between task T1 and T2.

Since TSE=1 for T1, if a task switch request is received while the neural task manager 310 is executing task T1, then the neural task manager 310 can set GTSP to 1 (see Rule 1). Next, since DPC=1 for T1, T3, T5, and T6 and GTSP=1, the neural task manager 310 can direct the output data 328 for tasks T1, T3, T5, and T6 to the system memory 230 (see Rule 2). Notice, since DPC=0 for tasks T0, T2, and T4, the output data 328 can be saved to the data buffer 318. Next, since TSR=1 for T6 and GTSP=1, the neural task manager 310 can set TQSP to 1 for the interrupted task queue 1004 associated with tasks T0-T13, can set GTSP to 0, and can conduct the task switch to a new task queue 1004 (see Rule 3). In these embodiments, note that the task switch does not occur until the neural task manager 310 reads TSR=1 in the task descriptor header 1202 of task T6.

Since TQSP=1 for the interrupted task queue 1004, the neural task manager 310 can return to the interrupted task queue (e.g., after finishing the new task queue 1004) so that the neural processor circuit 218 can execute tasks T7-T13. Since TQSP=1 and SPC=1 for tasks T7, T9, T11, and T13, the neural task manager 310 can read the input data from the system memory 230 (see Rule 4). Note, since SPC=0 for tasks T8, T10, and T12, the neural task manager 310 can read the input data from the data buffer 318. Since SPL=1 for T13, the neural task manager 310 can set TQSP to 0 to complete the task switching process (see Rule 5).

In these embodiments, if no task switch request is received while the neural task manager 310 is executing task T1, then GTSP may not be set to 1 (see Rule 1). As a result, the conditions of Rules 1-5 may not be met, and therefore, no task switch can occur. Additionally, FIG. 16 assumes tasks T7, T9, T11, and T13, use different channels of the inception layer (different parts of the output of T1, T3, T5, and T6). Tasks T7, T9, T11, and T13 can each separately read part of or all the output of T1, T3, T5, and T6. However, if some or all of the tasks have shared input from the previous tasks this input can be read from system memory 230 once and copied to the data buffer 318 for the use on the following tasks. For example, if T7 reads the entire output of T1, T3, T5, and T6, task T7 can have SPC=1 and SPL=1, while the task switching parameters for tasks T9, T11, and T13 can be zero.

The neural task manager 310 may decide which new task queue 1004 to switch to at any time. In some embodiments, the task switch request specifies the new task queue 1004. In some embodiments, the decision is not made until switching from the interrupted task queue 1004 is complete (e.g., after Rules 1-3 occur). For example, the neural task manager 310, can assess the priority parameters 1112 of the task queues 1004 after switching from the interrupted task queue 1004. If two or more task queues 1004 have a same priority parameter 1112, the neural task manager 318 can select a task queue 1004 by considering additional parameters, such as task queue 1004 indexes.

In some embodiments, a last task in a task list 904 of a current task queue 1004 has TSE=1 and TSR=1. This can allow the neural task manager 310 to switch to a new task queue 1004 after the current task queue 1004 is complete, even without receiving a task switch request. In some embodiments, a first task in a task list 904 of a task queue 1004 may have SPL=1. This can clear any task switching process that may have been set earlier for the task queue 1004. Furthermore, in embodiments where the first task receives its input data from the external system memory 230, setting SPL=1 for a first task prevents the first task from unintentionally receiving input data from the data buffer 318.

Figure 17:
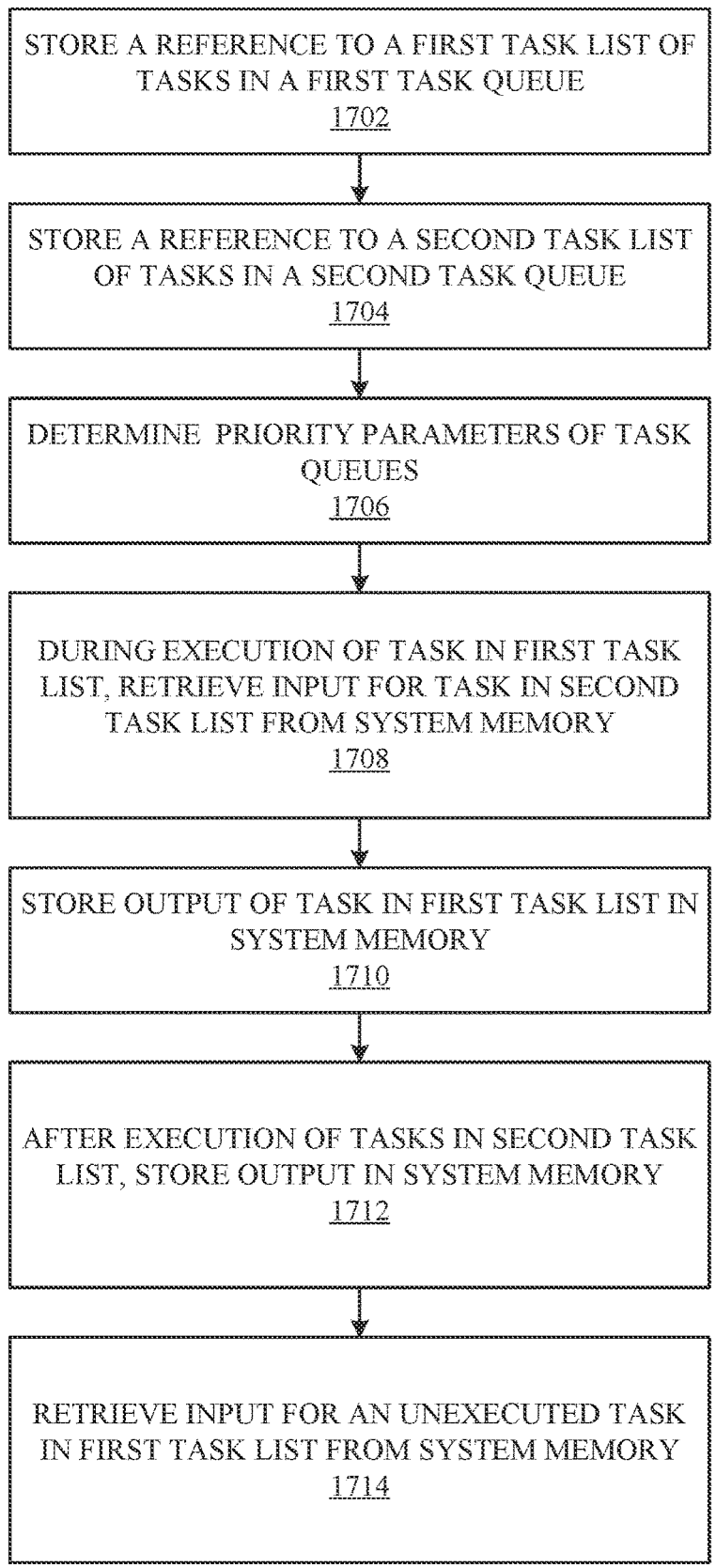
FIG. 17 is a flowchart illustrating a method of task switching in a neural processor circuit, according to one embodiment.

FIG. 17 is a flowchart illustrating a method of task switching in the neural processor circuit 218, according to one embodiment. The method may include different and/or additional steps, or the steps may be in different orders.

The CPU 208 stores 1702 a reference to a first task list 904 of tasks in a first task queue 1004 included in the neural task manager 310. The first task list 904 of tasks instantiates a first neural network 900 when executed by a neural processor circuit 218. The first task list 904 may include task descriptors 1012 of tasks stored in the system memory 230, and the reference may include pointers to memory locations storing the task descriptors 1012.

The CPU 208 stores 1704 a reference to a second task list 904 of tasks in a second task queue 1004 included in the neural task manager 310. The second task list 904 of tasks instantiates a second neural network 900 when executed by a neural processor circuit 218. The second task list 904 may include task descriptors 1012 of tasks stored in the system memory 230, and the reference may include pointers to memory locations storing the task descriptors 1012. The first and second task lists 904 may instantiate different neural networks.

The task queues 1004 are a part of the neural task manager 310 and the neural task manager 310 can include any number of task queues 1004 that each stores a reference to a task list 904 of task descriptors 1012 describing tasks. In some embodiments, each of the tasks, when executed, instantiates a single network layer of a neural network 900, multiple network layers of a neural network 900, or a portion of a network layer of a neural network 900. In some embodiments, each task list 904 of task descriptors 1012 includes configuration data 1014 that is stored in a location of the system memory 230.

The neural task manager 310 (e.g., through the task arbiter 1002) determines 1706 the priority parameters 1112 of the task queues 1004. If a task queue 1004 has a higher priority parameter 1112 than the current task queue 1004 being executed, then the neural task manager 310 may initiate a task switch process. For example, if tasks of the first task queue 1004 are being executed by the neural engine 314 and the second task queue 1004 has a higher priority parameter 1112 than the priority parameter 1112 of the first task queue 1004, then the task manager begins a task switch process. In some embodiments, the neural task manager 310 monitors the the priority parameters 1112 of the task queues 1004 over time to initiate the task switch During execution of a task of the first task list 904 by the neural engine 314, the neural task manager 310, by the task arbiter 1002, retrieves 1708 configuration data 1014, for a task in the second task list 904, from the system memory 230 and sends the configuration data 1014 to the neural processor 218. For example, the neural processor circuit 218 executes the task of the first task list 904 as discussed above in connection with FIGS. 8 and 14. While the task of the first task list 904 is executing, the configuration data 1014 programs the neural processor circuit 218 to instantiate a portion of the second neural network 900 by executing the task of the second task list 904. In some embodiments, the configuration data 1014 for the task in the second task list 904 is retrieved from the system memory 230 using the reference to the second task list 904 stored in the second task queue 1004.

In some embodiments, the configuration data 1014 for the task in the second task list 904 is stored in a configuration queue 1010 coupled to the neural engine 314 and configured to provide the configuration data 1014 to the neural engine 314. Furthermore, when the configuration data 1014 is stored in the configuration queue 1010, a prefetch process may be initiated where the kernel DMA 324 retrieves kernel data of the task from the system memory 230 to store in the kernel extract 432 and the buffer DMA 320 retrieves input data of the task from the system memory 230 to store in the data buffer 318.

In some embodiments, the task arbiter 1002 retrieves the configuration data 1014 via the task manager DMA 1006. Additionally, the configuration data 1014 for the task in the second task list 904 is stored in a fetch queue 1008. The fetch queue 1008 provides the configuration data 1014 to the configuration queue 1010 after configuration data 1014 previously in the configuration queue 1010 is removed (e.g., after execution of the task defined by the configuration data 1014). In some embodiments, the configuration data 1014 for the task in the second task list 904 replaces a previously inserted instance of configuration data 1014 in the fetch queue 1008 for the task in the first task list 904.

The output data 328 of the task in the first task list 904 is stored 1710 the system memory 230. If a task switch process is not in progress, then the output data 328 may be stored in the data buffer 318 for use as input data in a subsequent processing cycle, and without transfer to the system memory 230. In some embodiments, after the output data 328 is stored in the system memory 230, the neural processor circuit 218 begins executing the task of the second task list 904. One or more tasks in the second task list 904 may be executed by the neural processor circuit 218 to (e.g., fully) instantiate the second neural network 900.

If the second task list has multiple tasks, the neural engine 314 receives the output data 328 from the executed task in the second task list 904 from the data buffer 318 as input data for a second task of the second task list 904. From this, the neural engine 314 generates output data 328 from the executed second task of the second task list 904 and provides the output data 328 to the data buffer 318 for another task of the second task list 904, and so forth until each task in the second task list 904 has been executed. In some embodiments, execution of the tasks of the second task list may also be interrupted with a task switch.

After execution of the tasks in the second task list 904, the output data 328 of one or more tasks in the second task list 904 are stored 1712 in the system memory 230. In some embodiments, the priority parameters 1112 of the task queues 1004 continue to be monitored 1706 to determine the next task queue 1004 to execute.

When returning to an unexecuted task of the first task list 904 after execution of the second task list 904, configuration data 1014 for the unexecuted task is retrieved 1714 from the system memory 230. The configuration data 1014 may include the output data of the executed task of the first task list 904 stored in the system memory 230 in connection with the task switch. The configuration data 1014 may be used as input data for the next task of the first task list to be executed. The configuration data 1014 may be sent to the neural processor 218 to program the neural processor circuit 218 to instantiate a portion of the first neural network 900 by executing the task of the first task list 904. In some embodiments, the remaining unexecuted tasks in the first task list 904 are executed by the neural processor circuit 218 to (e.g., fully) instantiate the first neural network 900.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural processor circuit, comprising: a neural engine circuit configured to perform neural operations; a neural task manager circuit, comprising: a fetch queue configured to store a first task descriptor of a task of a first task list in a first task queue, wherein the first task descriptor includes a task descriptor header comprising a task switch parameter defining whether a task switch is to be initiated by the neural task manager circuit; and a task arbiter circuit coupled to the fetch queue and configured to: retrieve the first task descriptor and place the first task descriptor into the fetch queue; and in response to determining that a second task queue has a higher priority than the first task queue, switch to a task of a second task list in the second task queue from the task in the first task queue by replacing the first task descriptor stored in the fetch queue with a second task descriptor of the task in the second task queue; and a configuration queue coupled to the fetch queue and the task arbiter circuit and configured to store configuration data for one or more committed tasks including a committed task committed for execution, wherein the task arbiter circuit is further configured to remove, after the committed task has finished execution, a task descriptor or configuration data of the committed task from the configuration queue.

2. The neural processor circuit of claim 1, further comprising: a task manager direct memory access (DMA) coupled to the fetch queue and the task arbiter circuit, wherein the task arbiter circuit is further configured to: control the task manager DMA to retrieve the first task descriptor or the second task descriptor; and store the first task descriptor or the second task descriptor into the fetch queue.

3. The neural processor circuit of claim 1, wherein the first task queue is coupled to the task arbiter circuit and configured to store a reference to the first task list for instantiating a first neural network by the neural engine circuit configured to perform the neural operations for the task in the first task queue.

4. The neural processor circuit of claim 3, further comprising: a kernel direct memory access (DMA) configured to fetch kernel data from a system memory external to the neural task manager circuit and send the kernel data to the neural engine circuit to perform the neural operations; and a buffer DMA configured to receive input data from the system memory and send the input data to the neural engine circuit to perform the neural operations.

5. The neural processor circuit of claim 4, further comprising: a data buffer configured to store output data of the task in the first task queue used as input data for a subsequent task in the first task queue in response to no task switching for the task in the first task queue, wherein the data buffer is different from the system memory external to the neural task manager circuit.

6. The neural processor circuit of claim 5, wherein the data buffer is coupled to the buffer DMA and configured to store the input data from the system memory before sending the input data to the neural engine circuit to perform the neural operations.

7. The neural processor circuit of claim 1, wherein the first task queue includes a reference to a set of task descriptors including the first task descriptor stored in a system memory external to the neural task manager circuit, a first priority parameter to indicate a first priority for the first task queue, and a task queue switch parameter indicating whether the first task queue was interrupted due to the task switching to the task of the second task queue.

8. The neural processor circuit of claim 1, wherein the first task descriptor includes configuration data of the task in the first task queue, and wherein the task arbiter circuit is configured to extract the configuration data that programs the neural task manager circuit and the neural processor circuit to perform the neural operations.

9. The neural processor circuit of claim 1, wherein the first task descriptor includes the task switch parameter indicating whether the neural task manager circuit is to initiate a task switch after execution of the task in the first task queue.

10. The neural processor circuit of claim 1, wherein the first task descriptor includes an input surface parameter indicating whether input data for the task in the first task queue is to be retrieved from a system memory external to the neural processor circuit or a data buffer included in the neural processor circuit and configured to store output data of the task in the first task queue that is used as input data for a subsequent task in the first task queue.

11. The neural processor circuit of claim 1, wherein the first task descriptor includes an output surface parameter indicating whether output data of the task in the first task queue is to be stored in a system memory external to the neural processor circuit or a data buffer included in the neural processor circuit to facilitate programming of the neural processor circuit.

12. The neural processor circuit of claim 1, wherein the first task descriptor includes a task switch ready (TSR) parameter that defines whether the neural task manager circuit can perform task switching after execution of the task in the first task queue.

13. The neural processor circuit of claim 1, wherein the first task descriptor includes a source pointer last (SPL) parameter that indicates, after returning to an interrupted task queue, the task in the first task queue is a last task with input data stored in a system memory external to the neural processor circuit.

14. A method of task switching in a neural processor circuit, comprising:
retrieving a first task descriptor of a task of a first task list in a first task queue including a memory storing a first priority parameter defining a priority of the first task queue;
wherein the first task descriptor includes a task descriptor header comprising a task switch parameter defining whether a task switch is to be initiated by a neural task manager circuit;
storing the first task descriptor in a fetch queue of the neural task manager circuit, wherein the first task descriptor is placed in a configuration queue for execution of the task in the first task queue;
determining, by a task arbiter circuit of the neural task manager circuit, that a second task queue having a second priority parameter that is of a higher priority than the first priority parameter of the first task queue;
performing, by the task arbiter circuit, task switching to a task of a second task list in the second task queue from the task in the first task queue by replacing the first task descriptor stored in the fetch queue by a second descriptor of the task in the second task queue;
storing, by the configuration queue, configuration data for one or more committed tasks including a committed task committed for execution; and
removing, after the committed task has finished execution, a task descriptor or configuration data of the committed task from the configuration queue.

15. The method of claim 14, wherein the first task queue includes a reference to a set of task descriptors including the first task descriptor stored in a system memory external to the neural task manager circuit, the first priority parameter for the first task queue, and a task queue switch parameter indicating whether the first task queue was interrupted due to the task switching to the task of the second task queue.

16. The method of claim 14, wherein the first task descriptor includes configuration data of the task in the first task queue, and wherein the method further comprises extracting, by the task arbiter circuit, the configuration data that programs the neural task manager circuit and the neural processor circuit to perform neural operations.

17. The method of claim 14, wherein the first task descriptor includes the task switch parameter indicating whether the neural task manager circuit is to initiate a task switch after the execution of the task in the first task queue.

18. A system, comprising:
a neural engine circuit configured to perform neural operations;
a neural task manager circuit, comprising:
a fetch queue configured to store a first task descriptor of a task of a first task list in a first task queue including a memory storing a priority parameter defining a priority of the first task queue, wherein the first task descriptor includes a task descriptor header comprising a task switch parameter defining whether a task switch is to be initiated by the neural task manager circuit, wherein the first task descriptor is placed into a configuration queue for execution of the task in the first task queue, and wherein the configuration queue is coupled to the fetch queue and configured to store configuration data for the task in the first task queue once the task in the first task queue has been committed for execution;
a task arbiter circuit coupled to the fetch queue and the configuration queue and configured to:
retrieve the first task descriptor and place the first task descriptor into the fetch queue; and
in response to determining that a second task queue has a higher priority than the first task queue, switch to a task of a second task list in the second task queue from the task in the first task queue by replacing the first task descriptor stored in the fetch queue with a second task descriptor of a second task; and
the configuration queue configured to store configuration data for one or more committed tasks including a committed task committed for execution, wherein the task arbiter circuit is further configured to remove, after the committed task has finished execution, a task descriptor or configuration data of the committed task from the configuration queue.

19. The system of claim 18, further comprising: a task manager direct memory access (DMA) coupled to the fetch queue and the task arbiter circuit, wherein the task arbiter circuit is further configured to: control the task manager DMA to retrieve the first task descriptor of the task in the first task queue or the second task descriptor of the task in the second task queue; and store the first task descriptor or the second task descriptor into the fetch queue.

* * * * *